(12) United States Patent
Noris et al.

(10) Patent No.: US 8,766,982 B2
(45) Date of Patent: Jul. 1, 2014

(54) VECTORIZATION OF LINE DRAWINGS USING GLOBAL TOPOLOGY AND STORING IN HYBRID FORM

(75) Inventors: Gioacchino Noris, Zürich (CH); Alexander Hornung, Zürich (CH); Robert Sumner, Zürich (CH); Maryann Simmons, Glendale, CA (US); Markus Gross, Uster (CH)

(73) Assignee: Disney Enterprises, Inc., Burbank, CA (US)

(*) Notice: Subject to any disclaimer, the term of this patent is extended or adjusted under 35 U.S.C. 154(b) by 202 days.

(21) Appl. No.: 12/843,822

(22) Filed: Jul. 26, 2010

(65) Prior Publication Data

US 2011/0175916 A1 Jul. 21, 2011

Related U.S. Application Data

(60) Provisional application No. 61/296,462, filed on Jan. 19, 2010.

(51) Int. Cl.
*G06T 11/20* (2006.01)

(52) U.S. Cl.
USPC .................................................. 345/441

(58) Field of Classification Search
CPC ............................ G06K 9/00416; G06K 9/481
See application file for complete search history.

(56) References Cited

U.S. PATENT DOCUMENTS

| 6,560,361 | B1 | 5/2003 | Collins | |
| 6,891,549 | B2* | 5/2005 | Gold | 345/611 |
| 2007/0133031 | A1* | 6/2007 | Takaragi et al. | 358/1.13 |

OTHER PUBLICATIONS

Rik D. T. Janssen and Albert M. Vossepoel, Adaptive Vectorization of Line Drawing Images, Computer Vision and Image Understanding vol. 65, Issue 1, Jan. 1997, pp. 38-56, Article No. IV960484.*
B. J. H. Verwer, Improved metrics in image processing applied to the Hilditch skeleton, in Proc. 9th Int. Conf. Patt. Rec., Rome, Nov. 14-17, 1988, pp. 137-142, IEEE Comput. Soc. Press, 1988.*
Adrian Brown, Digital Preservation Guidance Note: 4, Graphics File Formats, DPGN-04, Issue 1, Jul. 9, 2003, pp. 1-14.*
Xavier Hilaire and Karl Tombre, Robust and Accurate Vectorization of Line Drawings, IEEE Transactions on Pattern Analysis and Machine Intelligence, vol. 28, No. 6, Jun. 2006, 890-904.*

(Continued)

*Primary Examiner* — Kee M Tung
*Assistant Examiner* — Frank Chen
(74) *Attorney, Agent, or Firm* — Kilpatrick Townsend & Stockton LLP

(57) ABSTRACT

An animation system can vectorize an image by generating, from an input drawing, a dataset corresponding to vector and digital representations of the input drawing such that a rendering engine could render an image having features in common with the input drawing from the representations, as a collection of strokes and/or objects rather than merely a collection of pixels having pixel color values. A vectorizer might receive an input image, generate a particle clustering data structure from a digitization of the input image, generate a stroke list, wherein strokes in the stroke list correspond to clusters of particles represented in the particle clustering data structure, generate a graph structure that represents connections between strokes on the stroke list, and determine additional characteristics of a stroke beyond the path of the stroke, additional characteristics being stored such that they correspond to strokes. The strokes might be generated using global topology information.

18 Claims, 15 Drawing Sheets

(56) References Cited

OTHER PUBLICATIONS

Singh et al., Self-Organizing Maps for the Skeletonization of Sparse Shapes, Jan. 2000, IEEE Transactions on Neural Networks, vol. 11, No. 1, pp. 241-248.*

Bartolo, A., et al., "Scribbles to vectors: preparation of scribble drawings for CAD interpretation," SBIM '07, 2007, pp. 123-130.

Chang, H., et al., "Vectorization of hand-drawn image using piecewise cubic Bezier curves fitting," Pattern Recognition, 1998, vol. 31, No. 11, pp. 1747-1755.

Comaniciu, D., et al., "Mean shift: A robust approach toward feature space analysis," IEEE Trans. Pattern Anal. Mach. Intell., 2002, vol. 24, No. 5, pp. 603-619.

Cornea, N. D., et al., "Curve-skeleton properties, applications, and algorithms," IEEE Trans. Vis. Comput. Graph., 2007, vol. 13, No. 3, pp. 530-548.

Fekete, J., et al., "Tictactoon: a paperless system for professional 2d animation," 1995, SIGGRAPH, pp. 79-90.

Freeman, H., "Computer processing of line-drawing images," ACM Comput. Surv.1974, vol. 6, No. 1, pp. 57-97.

Hilaire, X., et al., "Robust and accurate vectorization of line drawings," IEEE Trans. Pattern Anal. Mach. Intell., 2006, vol. 28, No. 6, pp. 890-904.

Hsu, S. C., et al., "Drawing and animation using skeletal strokes," SIGGRAPH '94, 1994, pp. 109-118.

Janssen, R. D. T., et al., "Adaptive vectorization of line drawing images," Computer Vision and Image Understanding, 1997, vol. 65, No. 1, pp. 38-56.

Kalnins, R.D., et al., "Wysiwyg npr: drawing strokes directly on 3d models," SIGGRAPH, 2002, pp. 755-762.

Kleinberg, J., et al., "Algorithm Design," Addison-Wesley Longman Publishing Co., Inc., 2005.

Lam, L., et al., "Thinning methodologies—a comprehensive survey," IEEE Trans. Pattern Anal. Mach. Intell., 1992, vol. 14, No. 9, pp. 869-885.

Lecot, G., et al., "ARDECO: Automatic Region Detection and Conversion," EGSR'06, 2006, pp. 349-360.

Liu, W., et al., "A survey of non-thinning based vectorization methods," SSPR/SPR, 1998, pp. 230-241.

Madeira, J.S., et al., "An approach to computer-supported cartooning," The Visual Computer, 1996, vol. 12, No. 1, pp. 1-17.

Orzan, A., et al., "Diffusion curves: a vector representation for smooth-shaded images," ACM Trans. Graph., 2008, vol. 27, No. 3.

Sun, J., et al., "Image vectorization using optimized gradient meshes," ACM Trans. Graph., 2007, vol. 26, No. 3, 11 pages.

TooNBoom Harmony—Production Pipeline, Datasheet [online], Toon Boom Animation, Inc. [retrieved on Jul. 29, 2013] Retrieved from the internet <URL: http://beta.toonboom.com/professionals/harmony/production-pipeline>, 2 pages.

Xia, T., et al., "Patch-based image vectorization with automatic curvilinear feature alignment," ACM Trans. Graph., 2009, vol. 28, No. 5, pp. 1-10.

Zhang, S. H., et al., "Vectorizing cartoon animations," IEEE Trans. Vis. Comput. Graph., 2009, vol. 15, No. 4, pp. 618-629.

Zou, J. J., et al., "Cartoon image vectorization based on shape subdivision," Computer Graphics International, 2001, pp. 225¬231.

Zwicker, M., et al., "Ewa splatting," IEEE Trans. Vis. Comput. Graph., 2002, vol. 8, No. 3, pp. 223-238.

* cited by examiner

VECTORIZATION OF LINE DRAWINGS USING GLOBAL TOPOLOGY AND STORING IN HYBRID FORM

CROSS-REFERENCE TO RELATED APPLICATIONS

The present application claims priority to U.S. Provisional Patent Application No. 61/296,462, filed on Jan. 19, 2010, titled "Vectorization of Line Drawings Using Global Topology and Storing in Hybrid Form", the entire contents of which are herein incorporated by reference for all purposes.

The present disclosure may be related to the following commonly assigned applications/patents:
U.S. patent application Ser. No. 12/509,382, filed Jul. 24, 2009 and entitled "Tight Inbetweening" naming Whited, et al. (hereinafter "Whited").

The respective disclosures of these applications/patents are incorporated herein by reference in their entirety for all purposes.

FIELD OF THE INVENTION

The present invention relates to animation in general and in particular to efficiently converting digitized drawings into vectorized form to allow for object-based and vector-based manipulation of elements of those drawings.

BACKGROUND OF THE INVENTION

There are many ways to create animation. In an extremely simple approach, someone types into a computer the coordinates of simple shapes, and a computer program stores the input as objects and then manipulates the objects. Obviously, such an approach is not practical for full use of animation capabilities today and would not be useful to artists who may want to spend time on creative approaches and input rather than tedious details. A much better animation creation system would allow for the artist to input animation details in a natural fashion and then work with those inputs.

One conventional approach is to provide the artist with a digitizing tablet, which outputs each stroke made by the artist as a discrete element, thus representing line drawings as a collection of vectors. From there, a graph of relationships of vectors might be generated and used in the animation process to, for example, keep connections between lines that collectively represent some closed bound of an object. For example, a collection of lines that represent a virtual character's body parts can be graphed so that arms and legs remain attached as the virtual character moves and that individual lines that represent connected elements remain connected.

For example, if there is a line in an image that represents the surface of a forearm and another line that represents the start of an elbow, the elbow line should remain connected to the forearm line even as the forearm moves, in order for the animation to make sense. This connectedness can be enforced by the animation system by having constraints on the coordinates in a virtual space for some of the lines representing strokes. Alternatively, the artists can edit each frame of an animation to reconnect lines that get disconnected, but this can be tedious and is unnecessary when the animation system can maintain the connectivity over hundreds of frames with little difficulty.

Of course, in order for the animation system to do this properly, the images being animated need to be expressed as strokes and/or objects (i.e., "vectors") rather than just arrays of pixel color values ("pixelated images"). However, if the input is a pixelated image, such as a hand-drawn and scanned drawing, or other inputs that do not contain the stroke/object structures, the input might simply be arrays of pixel color values with no indication of connectedness. Thus, it is often necessary to convert or generate stroke information and/or object information from an array of pixel color values.

The most common representations for digitization of images—raster and vector graphics—have complementary but mutually exclusive properties. On the one hand, scanned raster images capture details of an image down to the pixel level, but image editing is restricted to low-level pixel manipulation as well. On the other hand, vector graphics define an abstraction of the image content that allows for sophisticated editing operations, but the abstraction process generally loses the pixel-level detail.

In 2D animation the separation of these two representations is a fundamental issue. 2D animation drawings are traditionally created using pencil sketches and ink drawings on paper. These line drawings are then scanned and vectorized for further processing in the digital movie production pipeline. Advanced 2D animation tools, such as automatic inbetweening, inking, and painting, as well as realistic digital drawing tools are forced to adopt one of the two representations and convert between them. This conversion process generally decreases quality and loses many properties of the original drawings, such as stroke texture and subtle details.

One approach to the generation of a vectorized image is to have an artist view an overlay of a scanned image and "draw" an overlay of the strokes using a digitizing tablet. This can be tedious itself and it might not capture all of the expressiveness of the original artist.

There are conventional processes for "vectorizing" an image, i.e., generating a representation of a pixel array representing an image, such as a scan of a physically drawn image, wherein the representation is list, table, array, etc. of strokes, wherein each stroke data element might be represented by two endpoints and a set of polynomial coefficients, thus defining the path of the stroke. In many cases, the results of non-manual vectorization are less than desirable for good quality animation processes. Most existing methods for vectorization perform only a low-level analysis of the input image, without considering the global drawing structure. This manifests in errors such as wrong estimates of centerlines, inaccurate junction points, and merging of nearby strokes, which is a considerable problem for applications such as automatic inbetweening.

Thus, it would be useful to have a programmable system for generating stroke and object sets from pixelated images, but that also allows for artist inputs to the generating process so as to preserve the intended expressiveness desired for the final animation sequence.

REFERENCES

BARTOLO, A., CAMILLERI, K. P., FABRI, S. G., BORG, J. C., and FARRUGIA, P. J. 2007. Scribbles to vectors: preparation of scribble drawings for CAD interpretation. In *SBIM '07*, 123-130.

CHANG, H.-H., AND YAN, H. 1998. Vectorization of hand-drawn image using piecewise cubic Bezier curves fitting. *Pattern Recognition* 31, 11, 1747-1755.

COMANICIU, D., and MEER, P. 2002. Mean shift: A robust approach toward feature space analysis. *IEEE Trans. Pattern Anal. Mach. Intell.* 24, 5, 603-619.

CORNEA, N. D., SILVER, D., and MIN, P. 2007. Curve-skeleton properties, applications, and algorithms. *IEEE Trans. Vis. Comput. Graph.* 13, 3, 530-548.

FEKETE, J.-D., BIZOUARN, E., COURNARIE, E., GALAS, T., and TAILLEFER, F. 1995. Tictactoon: a paperless system for professional 2d animation. In *SIGGRAPH*, 79-90.

FREEMAN, H. 1974. Computer processing of line-drawing images. *ACM Comput. Surv.* 6, 1, 57-97.

HILAIRE, X., and TOMBRE, K. 2006. Robust and accurate vectorization of line drawings. *IEEE Trans. Pattern Anal. Mach. Intell.* 28, 6, 890-904.

HSU, S. C., and LEE, I. H. H. 1994. Drawing and animation using skeletal strokes. In *SIGGRAPH '94*, 109-118.

JANSSEN, R. D. T., and VOSSEPOEL, A. M. 1997. Adaptive vectorization of line drawing images. *Computer Vision and Image Understanding* 65, 1, 38-56.

KALNINS, R. D., MARKOSIAN, L., MEIER, B. J., KOWALSKI, M. A., LEE, J. C., DAVIDSON, P. L., WEBB, M., HUGHES, J. F., and FINKELSTEIN, A. 2002. Wysiwyg npr: drawing strokes directly on 3d models. In *SIGGRAPH*, 755-762.

KLEINBERG, J., and TARDOS, E. 2005. Algorithm Design. Addison-Wesley Longman Publishing Co., Inc.

LAM, L., LEE, S.-W., and SUEN, C. Y. 1992 Thinning methodologies—a comprehensive survey. *IEEE Trans. Pattern Anal. Mach. Intell.* 14, 9, 869-885.

LECOT, G., and LEVY, B. 2006. ARDECO: Automatic Region Detection and Conversion. In *EGSR '06*, 349-360.

LIU, W., and DORI, D. 1998. A survey of non-thinning based vectorization methods. In *SSPR/SPR*, 230-241.

MADEIRA, J. S., STORK, A., and GROSS, M. H. 1996. An approach to computer-supported cartooning. *The Visual Computer* 12, 1, 1-17.

ORZAN, A., BOUSSEAU, A., WINNEMOLLER, H., BARLA, P., THOLLOT, J., and SALESIN, D. 2008. Diffusion curves: a vector representation for smooth-shaded images. *ACM Trans. Graph.* 27, 3.

SUN, J., LIANG, L., WEN, F., and SHUM, H.-Y. 2007. Image vectorization using optimized gradient meshes. *ACM Trans. Graph.* 26, 3, 11.

TooNBoom, 2010. Harmony, January.

XIA, T., LIAO, B., AND YU, Y. 2009. Patch-based image vectorization with automatic curvilinear feature alignment. *ACM Trans. Graph.* 28, 5, 1-10.

ZHANG, S.-H., CHEN, T., ZHANG, Y.-F., Hu, S.-M., and MARTIN, R. R. 2009. Vectorizing cartoon animations. *IEEE Trans. Vis. Comput. Graph.* 15, 4, 618-629.

ZOU, J. J., and YAN, H. 2001. Cartoon image vectorization based on shape subdivision. In *Computer Graphics International*, 225-231.

ZWICKER, M., PFISTER, H., VAN BAAR, J., and GROSS, M. H. 2002. Ewa splatting. *IEEE Trans. Vis. Comput. Graph.* 8, 3, 223-238. [DOI: 10.1109/TVCG.2002.1021576].

BRIEF SUMMARY OF THE INVENTION

An animation system according to embodiments of the present invention can "vectorize" an image by generating, from an input drawing, a dataset corresponding to vector and digital representations of the input drawing such that a rendering engine could render an image having features in common with the input drawing from the representations, so that, for example, an image can be operated upon and manipulated by a computer-assisted animation system as a collection of strokes and/or objects rather than merely a collection of pixels having pixel color values.

In one approach, a vectorizer is a computer process running on specific hardware or a general-purpose computing platform programmed to perform such processes, including receiving an input image, generating a particle clustering data structure from a digitization of the input image, generating a stroke list, wherein strokes in the stroke list correspond to clusters of particles represented in the particle clustering data structure, generating a graph structure that represents connections between strokes on the stroke list, and determining additional characteristics of a stroke beyond the path of the stroke, the additional characteristics being stored such that they correspond to strokes.

The vectorizer might identify strokes using particle clustering and then extract a graph representing connections between strokes, to provide a global topology. The strokes can then be reconstructed using junction points defined by the graph rather than just local pixel data.

In some embodiments, each pixel is a point and in other embodiments, each pixel is represented as an elliptical splat.

In a hybrid representation, an image is stored as a hybrid data-structure that combines raster graphics and vector graphics into one consistent representation, capable of representing relevant information from a drawing from the global structure down to pixel-accurate texture and further attributes of each individual stroke. By combining vector data with texture information, accurate segmentation and mapping between drawing texture and the vectorized representation is possible.

One advantage of embodiments described herein is improved vectorization quality. Extraction of the global drawing topology provides accurate centerlines and classification of junctions, detail preservation and resilience to noise. Other advantages of embodiments described herein are allowing for texture-preserving high-level editing (deforming, adding, and removing strokes), realistic rendering after editing, enabling of morphing and inbetweening applications.

The following detailed description together with the accompanying drawings will provide a better understanding of the nature and advantages of the present invention.

BRIEF DESCRIPTION OF THE DRAWINGS

FIG. 11 comprises FIGS. 11(*a*), 11(*b*), 11(*c*), 11(*d*) and 11(*e*).

FIG. 12 comprises FIGS. 12(*a*), 12(*b*), 12(*c*) and 12(*d*).

FIG. 15 comprises FIGS. 15(a), 15(b), 15(c) and 15(d).

FIG. 16 comprises FIGS. 16(a), 16(b), 16(c) and 16(d).

FIG. 17 comprises FIGS. 17(a), 17(b) and 17(c).

FIG. 18 comprises FIGS. 18(a), 18(b), 18(c), and 18(d).

FIG. 19 comprises FIGS. 19(a), 19(b), 19(c), 19(d) and 19(e) that are magnifications of the image in the upper left of FIG. 19.

FIG. 21 comprises FIGS. 21(a), 21(b), 21(c), 21(d), and 21(e).

FIG. 22 comprises FIGS. 22(a), 22(b), 22(c), 22(d), 22(e), 22(f), 22(g) and 22(h).

DETAILED DESCRIPTION OF THE INVENTION

Figure 1:
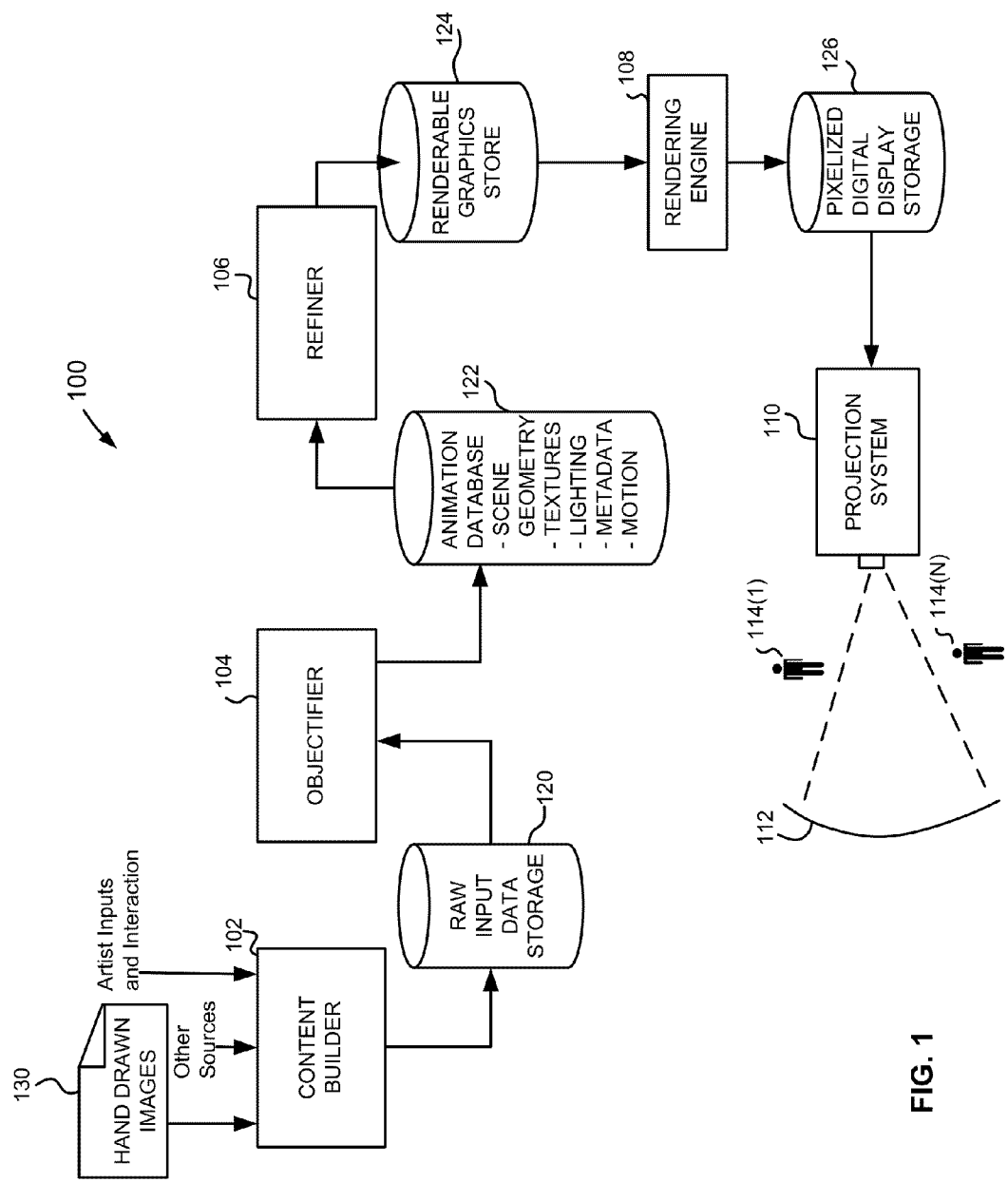
FIG. 1 illustrates a video system according to embodiments of the present invention.

An improved animation system with image vectorization is described herein. Such image vectorization is useful, for example, where a computer-assisted animation system is provided with a pixelated image that is to be animated or manipulated and it is desired to perform those operations on a data structure representing strokes and/or objects rather than on a data structure representing pixel color values.

Inbetweening (the creation of inbetween frames that fall between key frames in an animation sequence), especially tight inbetweening, is a time consuming and tedious task. Artists need to be very precise when they draw tight inbetween frames, but artistic interpretation is limited, so manual tight inbetweening is often not an ideal use of resources. As a result, it is useful to have at least a semiautomatic generator of inbetween frames. Examples of such an inbetween generator are described in Whited. Typically, where the input to an animation processing and editing system is hand-drawn images or other rendered images, the drawing is preferably converted from a pixel rendered image into a set of vectors representing the drawing in vector form rather than pixel form (known as "vectorization").

Some conventional vectorization processes fail to recover good vectors around junction locations and this can lead to unsatisfactory inbetween frames (and other vector processing problems) and/or require excessive touch-ups. The vectorizations described herein can be used in the context of inbetweening or in other contexts. For example, a vectorizer as described herein might be used as part of a 2D animation pipeline, as bridging technology for digital sketching systems, and for converting legacy scanned artwork to be converted into a representation compatible with a vector-based 2D pipeline.

In a two-step process for a specific vectorizer embodiment described herein, first a topology map of the image is extracted, and then the map is used to segment the image and extract vectors in an improved vectorization process. Also, with this process or other processes, improved representations are provided for. Existing vector representation for drawings make use of stroke centerlines with specified thicknesses and that is often not visually satisfying artists handling the editing of those images. In a novel approach, the pixels that contribute to strokes are represented by a parameterization of the pixels in the raster input image.

In this description, an animation system that could be implemented in hardware and/or software is described, followed by details of how parts of that animation system can be used to vectorize images such that they are easier to vectorize into correct representations that are easily operated upon.

First Example Process

For an optimal preservation of all aspects of an input drawing, the digitization and vectorization should not require preprocessing (e.g., smoothing) of an image. Smoothing is not required in this approach. The input can be is a standard digital scan of a line drawing at an arbitrary (i.e., the desired) resolution. Then the image is processed in three phases in this first example process: (1) low level stroke analysis by particle clustering, (2) high-level, topological analysis of the drawing and stroke properties, and (3) storing the results as a hybrid representation.

In the first phase, an initial stroke analysis is represented as a self-organizing particle clustering process operated by the vectorizer using information stored as to each such particle. In a specific implementation, all foreground pixels in the scan are identified using a predetermined color model of the paper background. Each foreground pixels gets assigned a particle, with mass, color, and further properties based on the color of the input pixel. A pseudo-physical particle simulation then contracts and clusters nearby particles in order to separate and identify strokes from each other. Each resulting cluster represents a stroke of the drawing. The contracted particles are then connected with each other to form a low-level connectivity graph of the drawing.

For the topological analysis of the drawing and stroke properties, given the graph of the clustered particles, the vectorizer first identifies end points of strokes. Using these endpoints, the graph is iteratively coarsened until the vectorizer can extract the high-level topology of the graph, i.e., individual strokes, junction points of the drawing between different strokes, etc. By an iterative stroke removal and recomputation of the clustering at junctions, the vectorizer can identify exact junction positions even in complex situations.

The hybrid representation can take a number of forms. For example, from the graph topology, junction points, etc, the vectorizer might reconstruct a vectorized curve (piecewise polynomial representation, or the like) for each stroke. With each vectorized stroke, additional parameters can be stored, such as drawing speed, pen pressure while drawing, etc. Each input pixel (see FIG. 9) is then represented by an elliptical splat and stored with a parameterized position with respect to its corresponding vectorized stroke curve. This data structure stores the high-level, vectorized stroke information as well as the individual stroke texture at maximum detail and allows archiving, editing, and re-render line based drawings.

In some implementations, each input pixel is represented by an elliptical splat, but in other implementations, different representations are used, such as quad meshes, triangle meshes, other forms of basis functions (e.g., Gaussian basis functions) or the like.

Second Example Process

In a second example process, the image is processed in what can be described as four phases: (1) low level stroke analysis by particle clustering, (2) high-level, topological analysis of the drawing and stroke properties, (3) reconstruction of junctions and centerlines by reverse drawing, and (4) storing the results as a hybrid representation.

This process provides for a bottom-up approach to generate the hybrid stroke representation from a raster image of a line drawing. In each step, beginning with simply a raster image (an array of pixel color values), the process involves extracting higher level information from the available data, until the full (or desired) representation has been created.

First, a cluster graph is created. Initially, the only information available is the collection of pixel representatives, $G_j$. Direct vectorization from unprocessed pixels often leads to inaccurate center line estimates in ambiguous regions, where strokes are very close to each other or are branching, or where the stroke texture is noisy. For disambiguation, the stroke process infers information about the approximate location of centerlines from the pixel representatives $G_j$. In general, the processor will make a guess, for each $G_j$ as to, the centerline location based on the image gradient, and to initiate a self-organizing clustering process around the pixel representatives, where those $G_j$ with a "confident" guess will "move" themselves towards the centerline (i.e., the processor assigns a new location and stores that new locate after a pass over the data), and propagate their confidence to neighboring pixels. This process can result in a set of gradients. Here, this gradient at a pixel's original image location is referred to as $\nabla_j$. Intuitively, this clustering step can be considered a particle simulation for gradient-based, continuous skeletonization. After this process, the $G_j$ are clustered approximately at the stroke centers.

The remaining steps are described in further detail elsewhere herein.

Applications for Line Drawings

In addition to providing a representation that is easy to animate and operate on, these techniques can be used for other applications. For example, it might be used to archive drawings. Instead of a separate, decoupled scan and vectorization, this vectorizer can combine information into a single consistent data structure.

Based on the hybrid representation, digitized drawings can be edited while preserving important characteristics of the original drawing. For example, an editor could easily apply corrections such as modifying the shape of a character's head, eye, or the body pose. The texture of the original drawing would be perfectly preserved. In a similar way, it is possible to re-render the same line-drawing, but with a different pen thickness, texture, colorization, etc. An editing station might also allow for the insertion of new strokes that match the texture and style of the overall drawing.

Interpolation between two or more drawings in the hybrid representation is also possible, such as for key-frames. One advantage of the hybrid representation is that it can interpolate the vectorized shape as well as the texture of the single strokes.

Hardware for Implementing Video System

FIG. 1 illustrates a video system 100 for creating, modifying and presenting animation, comprising a content builder 102, an objectifier 104, a refiner 106, a rendering engine 108, a projection system 110 and a screen 112 on which the animation is projected for viewers 114. It should be understand that some of these elements can be implemented in software, hardware or a combination of hardware and software. The software could be separate modules or a larger system having several functions. Also, one or more of these elements could include (often not shown) memory, inputs, outputs, input devices and output devices for human, computer or electronic interfaces. It should be apparent from a reading of this description, that many of these elements can be implemented as a general purpose computer executing program code, while accepting inputs and issuing outputs and storing, reading and writing to memory allocated to that program code.

In the embodiment shown in FIG. 1, content builder 102 receives various inputs and generates raw input data, which is shown being stored in storage 120. Examples of inputs are hand-drawn images 130, artist inputs and interactions and other sources. The raw input data might include digitized images, entries by an artist to indicate how objects would behave, motion capture data, instructions, metadata, etc.

Objectifier 104 processes the raw input data to construct representative objects, i.e., data structures that represent images in object form. For example, if raw data included a scan of a hand-drawn image of a sphere, two characters and some line art, the raw data might comprise arrays of pixel values as derived from a scanner output. Objectifier 104 would process this raw data to identify the shape, locations, textures, etc. of the virtual objects represented by those pixels and store into an animation database 122 object descriptions (although in some cases, the objects might be described solely by pixel values (colors) of pixels in a pixel array. Objectifier 104 might "vectorize" pixel values to identify lines from images, a 3D modeler to identify shapes and structures from input data, a graph generator that calculates the likely connections between different objects. The resulting graph might, for example, be useful for determining animations and indicating which objects need to stay connected to what other objects or when multiple objects are subparts of a larger object structure. Objectifier 104 might also include a user interface, to allow for artists to provide inputs to an objectification process and/or provide manual corrections to the results.

In one embodiment, animation database 122 includes a collection of object descriptions (the scene geometry, 3D objects, 2D strokes), textures, lighting, motion information, such as paths that objects take over a series of frames. For example, the animation database might include storage for a collection of objects that are parts of a character and storage for motion information describing how each of those objects moves from frame to frame. In an extremely simple case, the animation database might indicate that the scene geometry includes a textured, static background, a blue cube having an edge length of 4 units of length in the virtual space, and motion data to indicate that the cube does not rotate but translates 2 units up and 1 unit to the left for three frames, then stops and drops with a specified rotation for the next 10 frames. In a much more complicated case, the animation database includes all of the objects needed to describe a scene outside a French bistro, with two characters (made up of thousands of body elements) sitting at a table and carrying on a conversation. Additionally, animation database 112 might include metadata not about the scenes to be generated, per se, but information about how the other data was generated and/or edited, for use in subsequent processing steps and/or editing steps. The animation database might be implemented in any manner of data structure and/or storage, and need not be stored in a highly-structured database management system, so long as the animation data is electronically readable.

Refiner 106 processes data from animation database 122 to refine the animation. For example, refiner 106 might include a module for determining occlusions (where one object obscures another, which is useful information when animating the front object moving away so as to show more of the back object, or where two separate regions of a view are part of the same object, but obscured by one or more front objects), a module for filling in details, such as inserting information for generating inbetween frames based on key frame information contained in animation database 112. Refiner 106 might also include a module for display compensation.

Display compensation might be done for concave screens (to compensate for screen-to-screen reflections not dealt with for flat screens), for stereoscopic presentations (to compensate for ghosting from the image bound for one eye onto the image bound for the other eye) and other display compensation. Thus, refiner 106 might have inputs for screen parameters, as well as storage for screen parameters, artist inputs, technician inputs, and the like, as might be useful for refining an animation.

The output of refiner 106 is to a store 124 for renderable graphics data. It may be in some embodiments, that animation database 112 is used for pre-refined animation and post-refined animation. Either way, rendering engine 108 can take the renderable graphics data and output pixelized digital display data that is stored in storage 126. Rendering engine 108 can run in real-time or not. The pixelized digital display can be in a raw form, such as a 2D pixel array with dimensions specified by a maximum resolution (e.g., 1920×1280, 1280× 720), with each element of the array representing a pixel color value (often three or four "component" values). The pixelized digital display data might also be compressed, but the storage format need not be detailed here.

The pixelized digital display data is readable by projection system 110, which then projects the image sequences for viewing. It may be that the pixelized digital display data includes more than just arrays of pixel values, as it might include other data useful to the projection system, such as some of the data used in processing, assumptions about the screen, etc. Also, projection system 110 might also be provided with one or more synchronized audio tracks. In many cases, an animation is created by one entity, such as a filmmaker and the pixelized digital display data is distributed to a presenter in the form of digital transmission, storage on medium and transported to the presenter, such as a theater proprietor, DVDs transported and sold to end customers for small-scale viewing, medium provided to broadcasters, etc. As such, the generation of the animation might be done by one party independently of what a recipient of the medium and/or transmission does for the presentation. However, the animation process might be informed by actual or presumed details of how the presentation is to occur. As one example, the compensation might vary for varying projectors. As another example, the resolution and color depth might vary at the rendering engine (and/or elsewhere) based on formats used by presenters (such as DVD formats, vs. standard broadcast format, vs. theatre presentation).

Also the animation path, artist inputs can be accommodated. "Artist" can refer to any user that provides input, such as a graphic artist, an animator, a director, a cinematographer, their assistants, etc. Different skill levels can be accommodated. For example, not many animation skills are needed to input scanned drawings, but more skills are needed to provide inputs to the look of a particular key frame.

Figure 2:
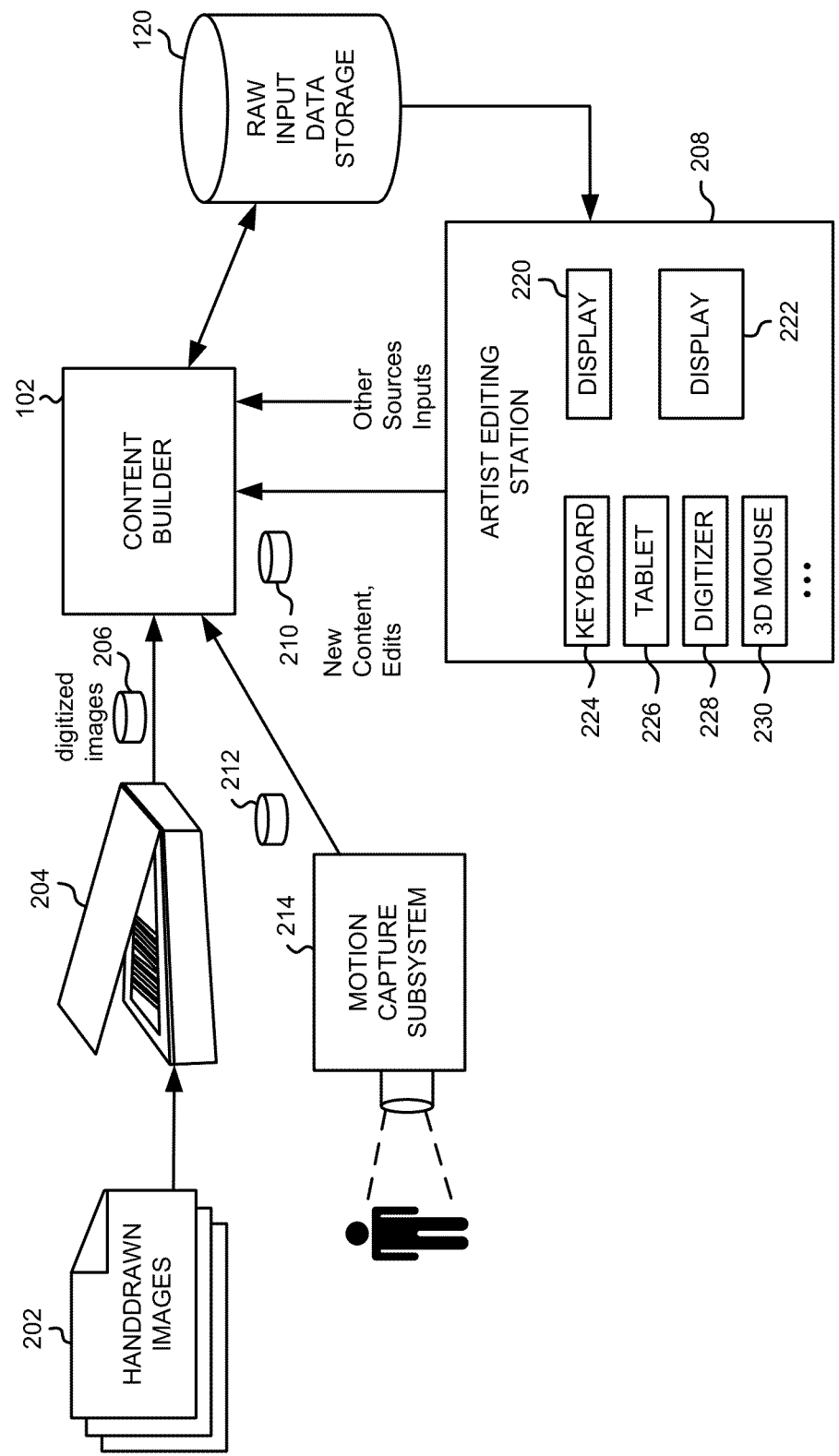
FIG. 2 illustrates elements of video system in more detail.

FIG. 2 illustrates elements of video system 100 in more detail. In the examples shown there, content builder 102 receives digitized images 206 from a scanner 204 when scanning hand-drawn images 202. Content builder 102 can also receive new content and edits to existing content as inputs 210 from an artist editing station 208, as well as motion capture data 212 from a motion capture subsystem 214. As illustrated, artist editing station 208 includes a keyboard 224, a tablet 226, a digitizer 228, a 3D mouse 230, a display generator 220 and a display 222. Using artist editing station 208, an artist can view the raw input data and make changes to the inputs.

Artist editing station 208 might also be configured to allow for artist editing of the raw input data directly, but usually it is more convenient and/or intuitive to allow the artist to modify the inputs. For example, rather presenting a display of what the raw data represents on display 222 and requiring the artist to modify the data structures in storage 120 that represent a motion capture data point when the artist determines that something doesn't look right, it might be preferred to provide the artist with tools to specify modifications to the motion capture process (add, delete points, recapture, etc.) and have content builder 102 rebuild the raw data. This frees the artist to make artistic changes at a higher level, while providing fine control and not requiring data management experience.

In operation, multiple artists and others might edit the data in multiple rounds until the acceptable raw data is achieved. In some embodiments, as explained below, an editing station might allow for multiple stages of editing.

Figure 3:
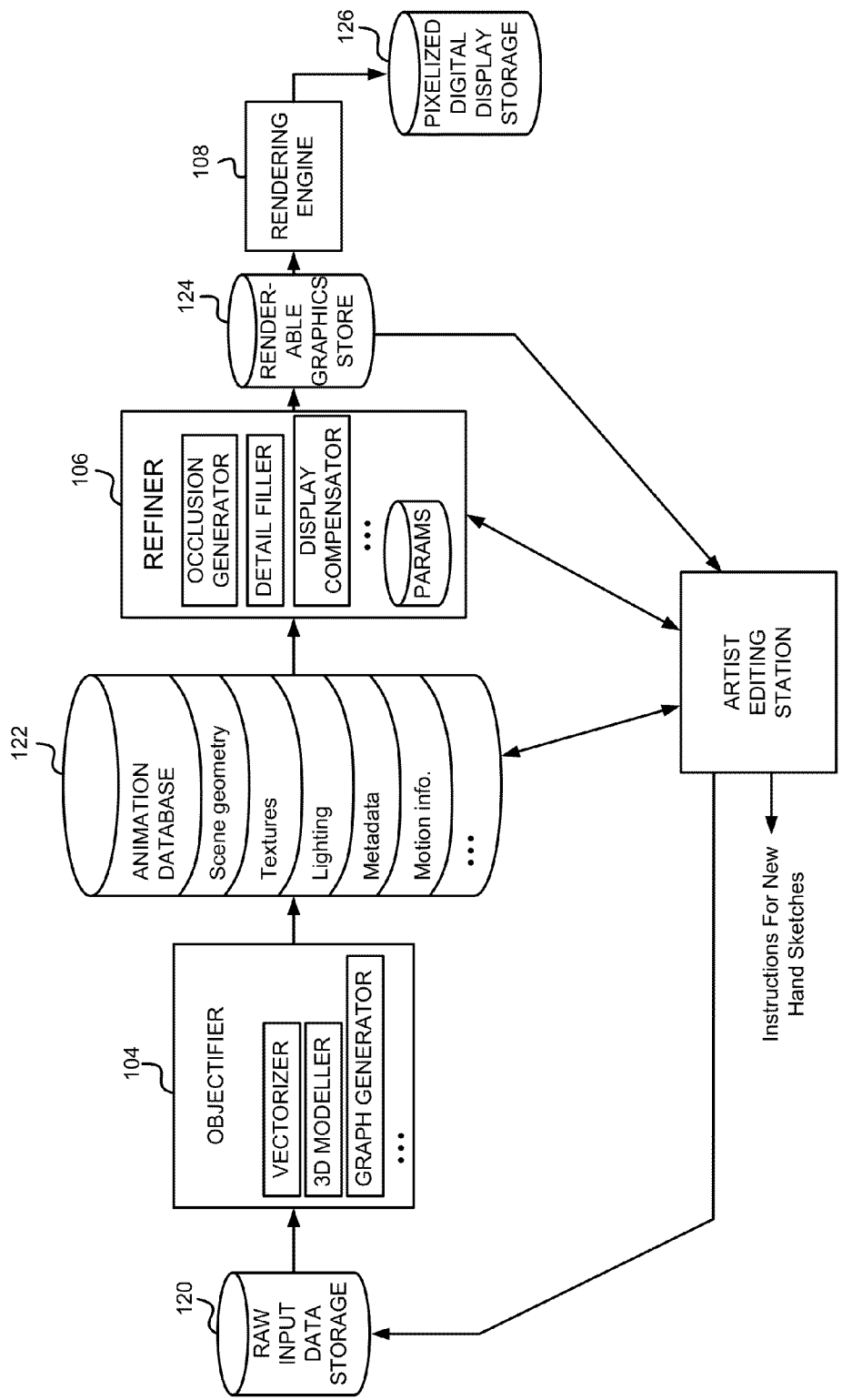
FIG. 3 illustrates elements of video system in other detail including an editing station.

FIG. 3 illustrates elements of video system 100 in other detail illustrating such as an editing station 300. As illustrated there, editing station 300 is coupled to raw input data storage 120 to write new raw input data (and could read), coupled to animation database 122 to read and write animation data, coupled to storage 124 to read renderable graphics, and coupled to read and write parameters for refiner 106. As illustrated, objectifier 104 processes the raw input data to populate animation database 122, refiner 106 refines the (at least some of the) contents of animation database 122 and outputs it as renderable graphics, which rendering engine 108 can produce as pixelized digital display data. Thus, in concept, an entire feature film can be specified by the contents of animation database 122, it can be rendered in whole or part, reviewed at an editing station and modified. Ideally, the tools provided at the editing station are suited to high-level editing and are intuitive with what the artists are providing. In some cases, the editing station might generate instructions for additional operations needed to obtain new or additional raw input data, such as additional hand-drawn sketches and additional motion capture or CGI processing.

Figure 4:
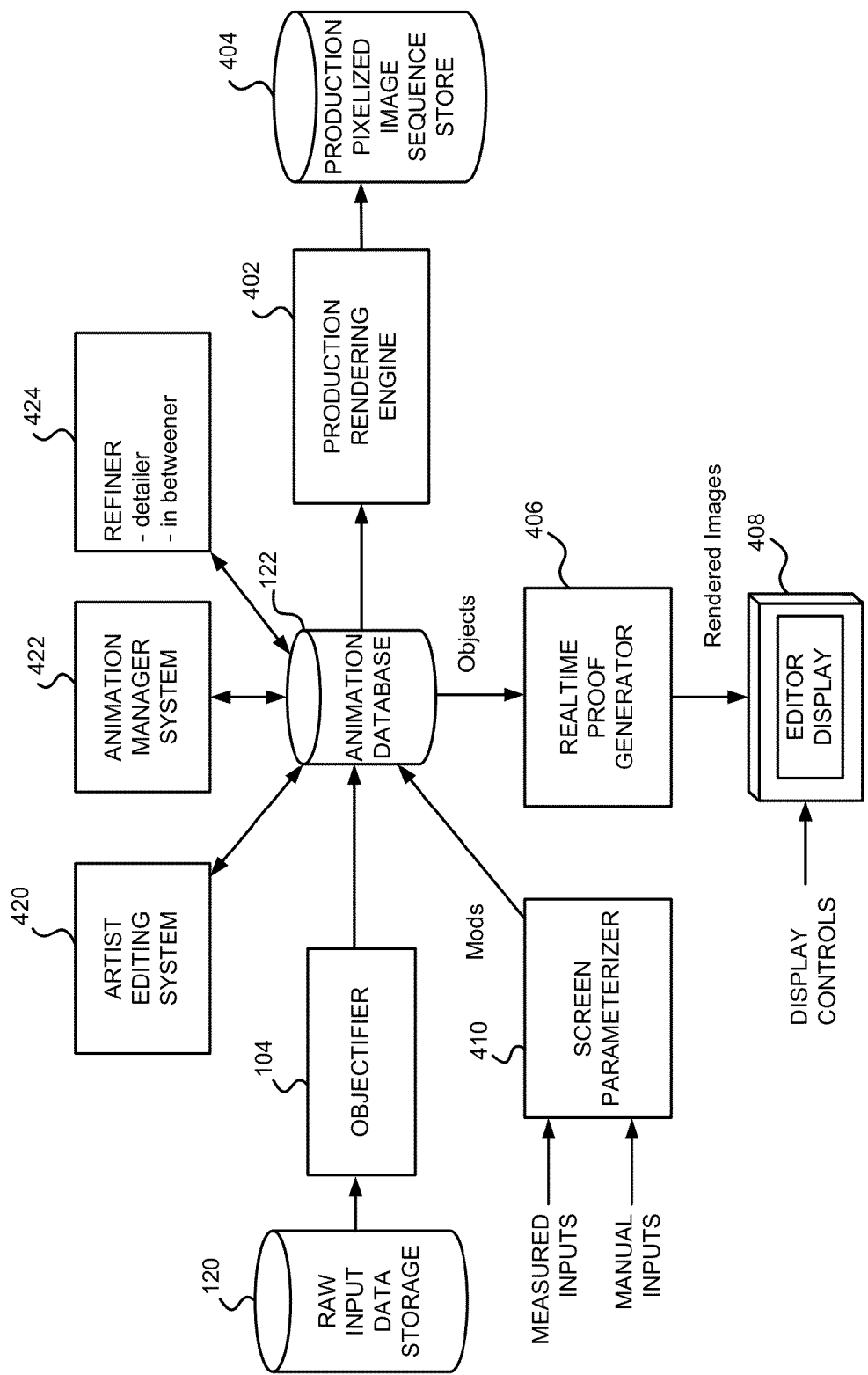
FIG. 4 illustrates a variation wherein an animation database forms central storage for various processing and edits.

FIG. 4 illustrates a variation wherein the animation database forms the central storage for various processing and edits. As illustrated there, raw input data from storage 120 is read by objectifier 104 and written to animation database 122, as in the previous example. However, the various editors edit to animation database 122, which can then be the source for a production rendering engine 402 that renders production-quality and writes to production pixelized image sequence store 404, as well as the source for real-time proof generator 406 (which can be a lower resolution and/or quality renderer) that outputs rendered images to an editor display 408. As illustrated there, animation database 122 might receive screen information from a screen parameterizer 410 that determines, from measured inputs and/or manual inputs, parameters about the screen for which the rendering is to occur—such as its distance from the projector lens, its radius of curvature, the cross-over illumination from one stereoscopic image to another (such as cross-pollution of polarized images). Other changes can come from an artist editing system 420, an animation manager system 442, and/or a refiner 424. Artist inputs might be converted to raw input data, but typically enough information would be available to generate objects from the artist inputs.

Figure 5:
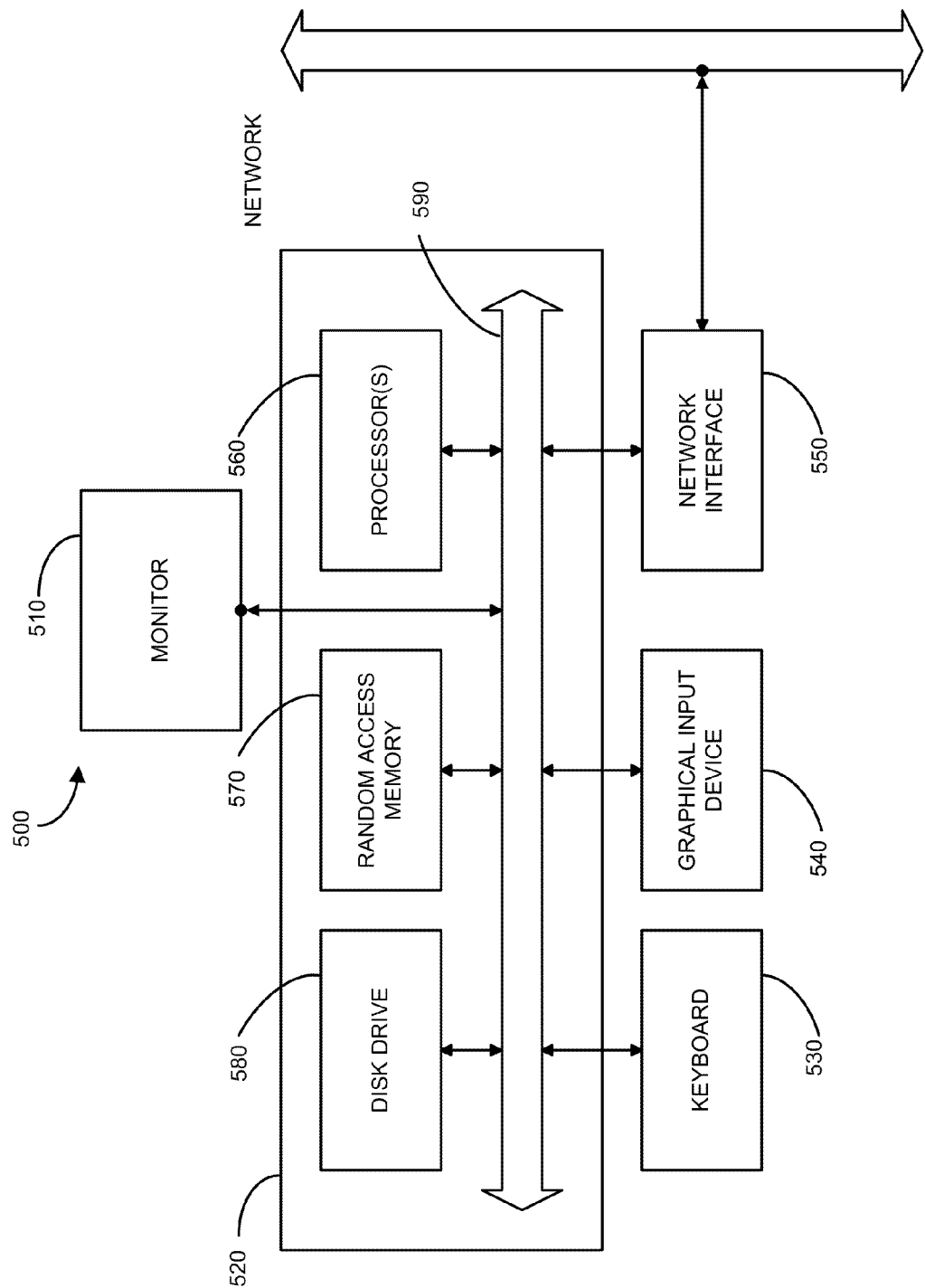
FIG. 5 illustrates an example artist editing system usable for animation management according to an embodiment of the present invention.

FIG. 5 illustrates an example artist editing system 500 usable for animation management according to an embodiment of the present invention. In the presently described embodiment, artist editing system 500 typically includes a display/monitor 510, computer 520, a keyboard 530, a user input device 540, computer interfaces 550, and the like.

Images can be input using a scanner (not shown), received over a network or other interface, stored in memory or hard disk storage, or drawn directly into the system where such functionality is provided and/or obtained from a data storage device depicted elsewhere. The interfaces and/or memory might also be used to provide the metadata about images, animation sequences and the like.

In various embodiments, display/monitor 510 may be embodied as a CRT display, an LCD display, a plasma display, a direct projection or rear projection DLP, a microdisplay, or the like. In various embodiments, monitor 510 may be used to visually display user interfaces, images, or the like as well as being part of an interactive environment that accepts artist inputs, shows results of animation generation and metadata, etc. and accepts further input.

In the present embodiment, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the display/monitor 510 via a command such as a click of a button or the like as well as making moving inputs, such as signaling a curve or association of objects, drawing lines, etc.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520 and/or include software drivers, or the like.

In various embodiments, computer 520 typically includes familiar computer components such as a processor 560, and memory storage devices, such as a random access memory (RAM) 570, disk drives 580, and system bus 590 interconnecting the above components. RAM 570 or other memory might hold computer instructions to be executed by one or more processors as a mechanism for effecting some functionality described herein that is implemented in software. In one embodiment, computer 520 includes one or more Core™ microprocessors from Intel. Further, in the present embodiment, computer 520 typically includes a UNIX-based operating system.

RAM 570 and disk drive 580 are examples of computer readable tangible media configured to store embodiments of the present invention including computer executable code implementing techniques described herein, data such as image files, object/scene models including geometric descriptions of objects, images, metadata about images and user inputs and suggestions, procedural descriptions, a rendering engine, executable computer code, and/or the like. Other types of tangible media may include magnetic storage media such as floppy disks, networked hard disks, or removable hard disks, optical storage media such as CD ROMS, DVDs, holographic memories, and/or bar codes, semiconductor memories such as flash memories, read only memories (ROMS), battery backed volatile memories, networked storage devices, and the like.

In various embodiments, artist editing system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit or "GPU", may be used to accelerate various operations.

FIG. 5 is representative of a computer system capable of embodying the present invention. It will be readily apparent to one of ordinary skill in the art that many other hardware and software configurations are suitable for use with the present invention. For example, the computer may be a desktop, portable, rack mounted or tablet configuration.

Additionally, the computer may be a series of networked computers. Further, the use of other micro processors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or WindowsXP™ or the like from Microsoft Corporation, Solaris™ from Sun Microsystems, Linux, Unix, or the like. In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Hardware and Software for Vectorization

Figure 6:
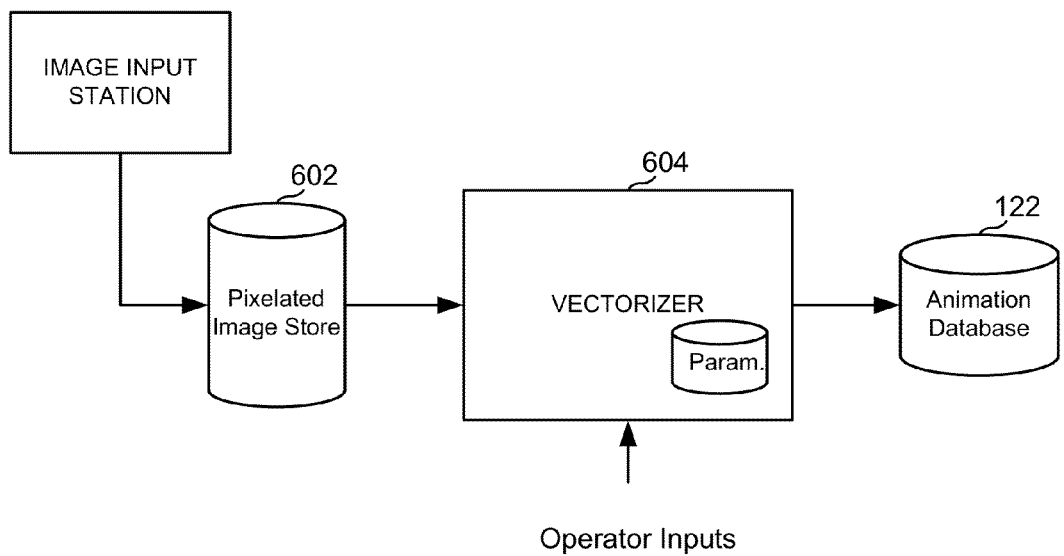
FIG. 6 is a block diagram illustrating a vectorizer.

FIG. 6 illustrates a vectorization processor in greater detail. As illustrated there, images read from storage for pixelated images 602 received from an image input station are provided to a vectorizer 604, that includes storage for parameters such as might be provided by operator inputs. The output of vectorizer 604 can be stored in animation database 122 and used for further operations, being stored as a data structure representing strokes and/or objects.

Figure 7:
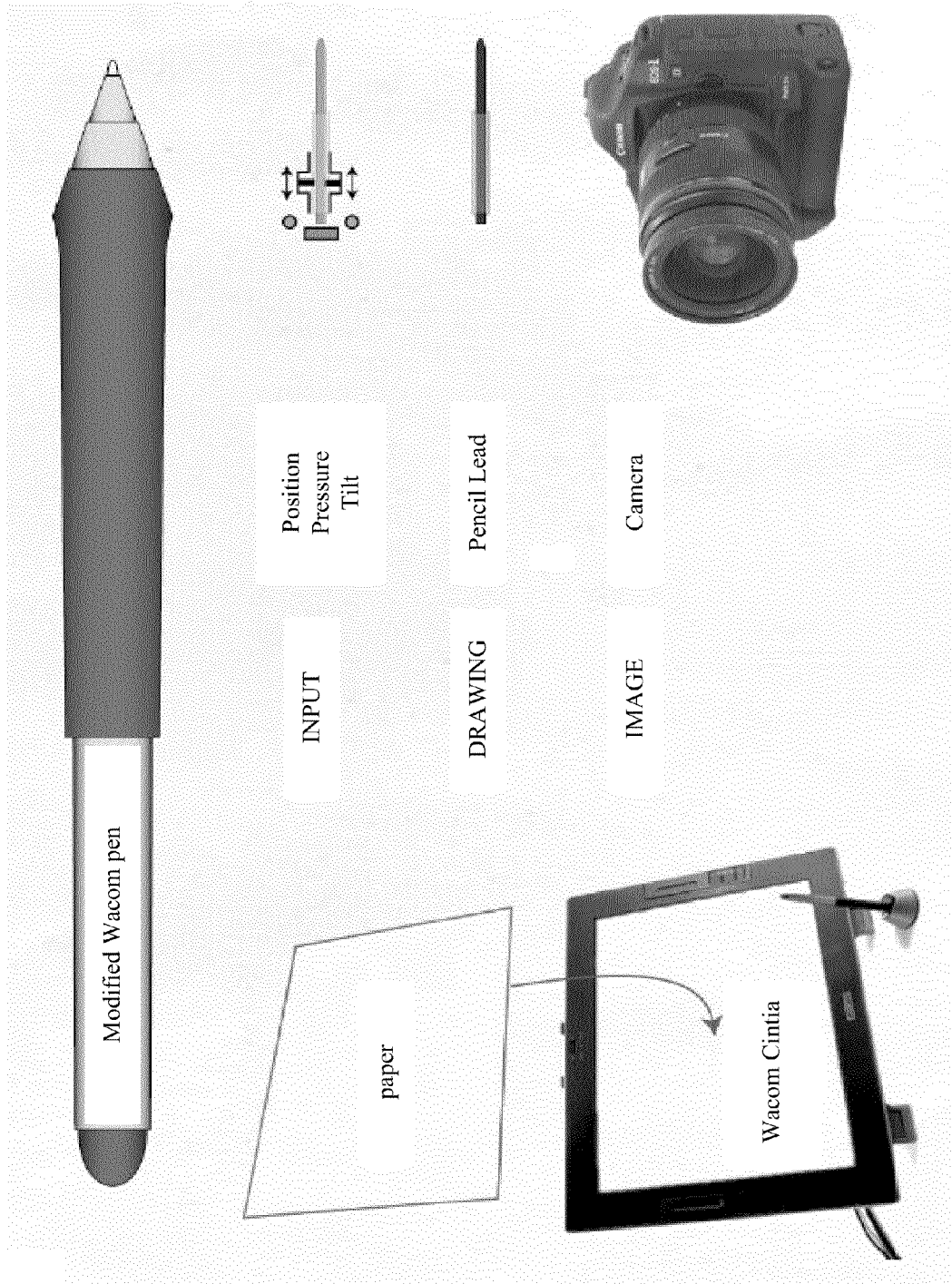
FIG. 7 is a block diagram illustrating portions of an image input station.

FIG. 7 illustrates elements that could form part of an input station. In one embodiment, the input station is simply a scanner.

Figure 8:
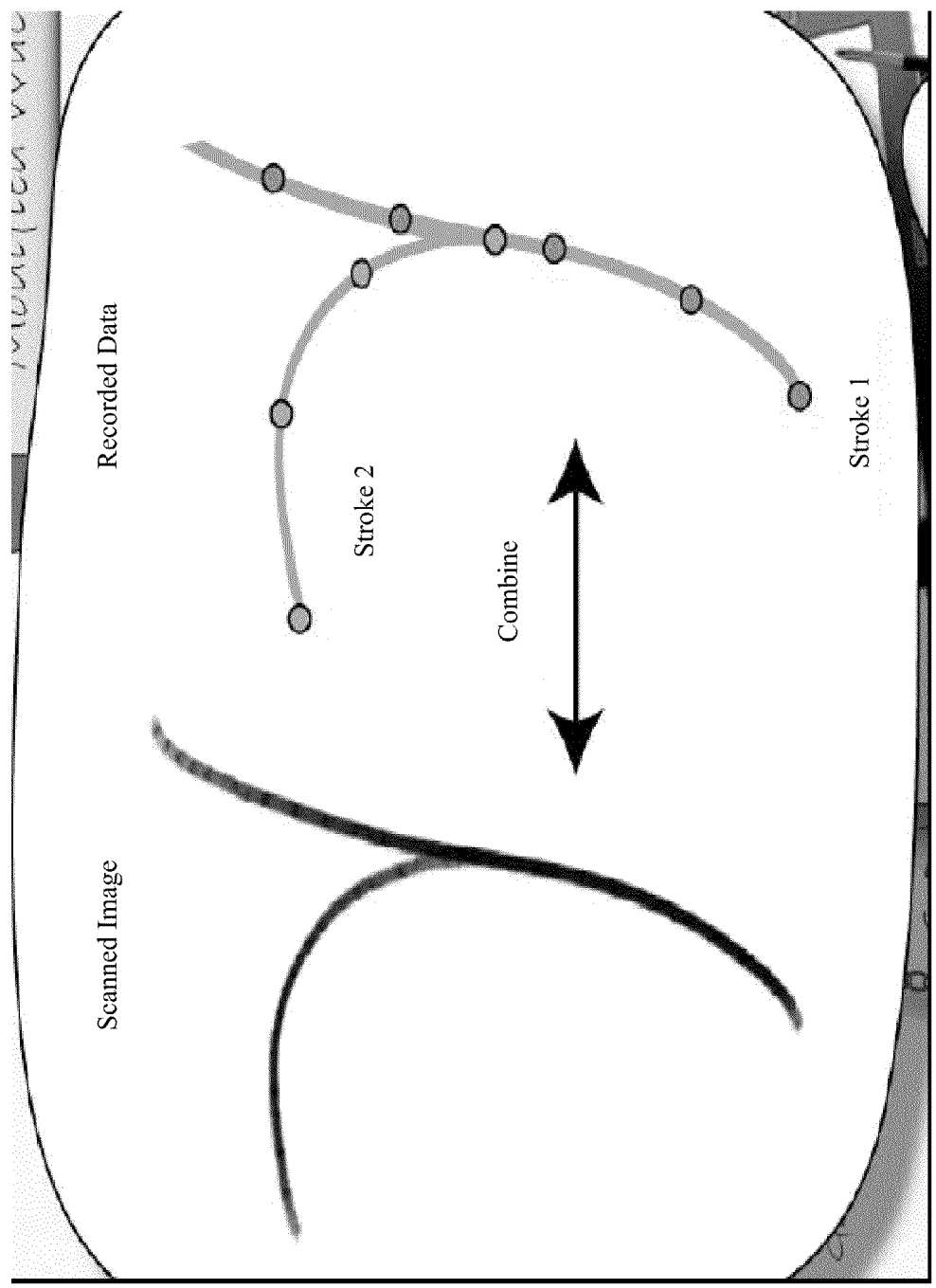
FIG. 8 is an illustration of the image data being captured by the image input station.

FIG. 8 illustrates how stroke points can be obtained for a recorded data image.

Figure 9:
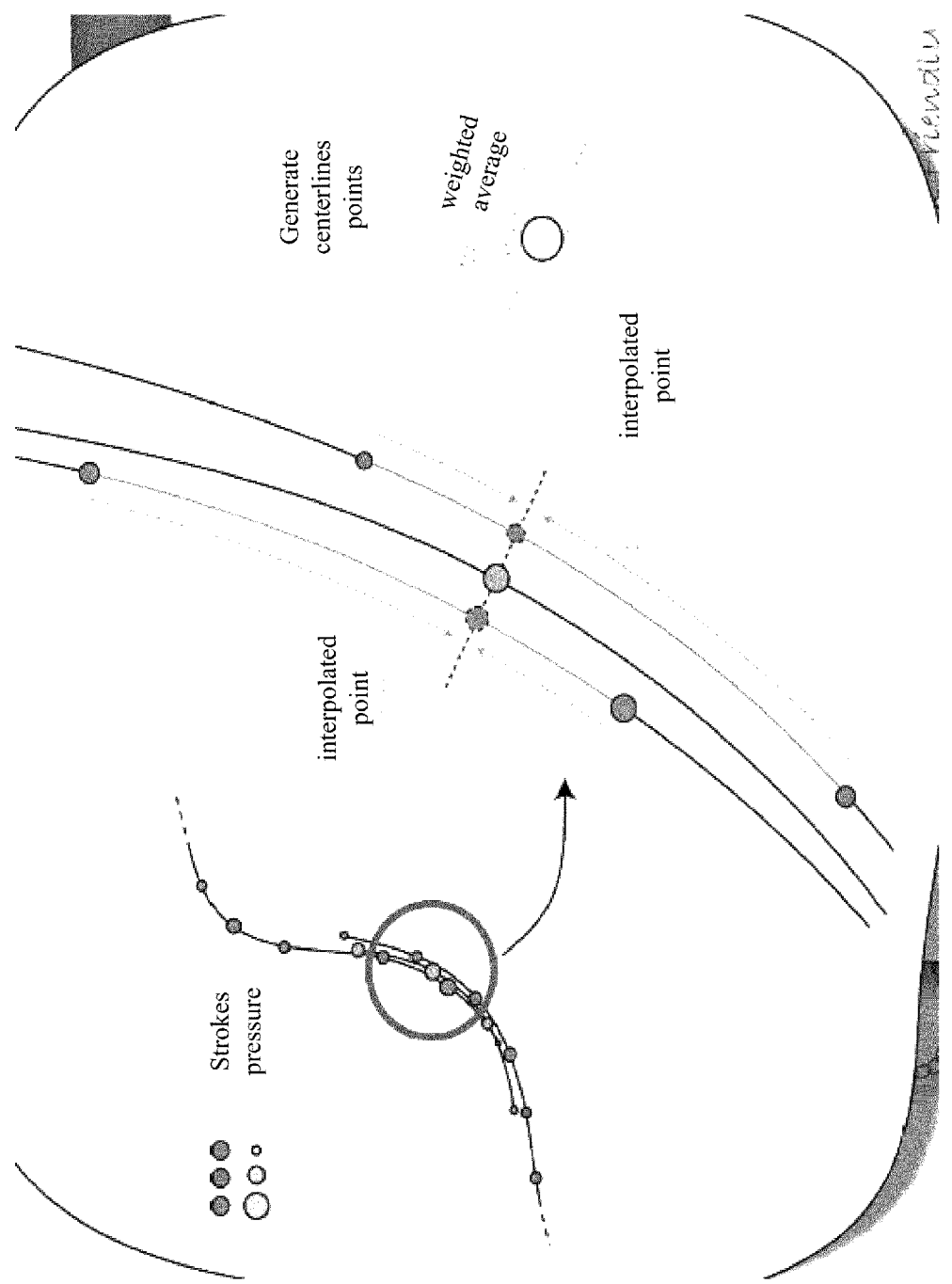
FIG. 9 illustrates centerline generation.

FIG. 9 illustrates a centerline determination process.

In the vectorizer embodiment described first, the vectorizer extracts high-quality centerlines (that define a path of a line) from the image, and then generates an image representation that includes centerlines, connection graphs and other structures about the image. This representation allows high-quality rendering as well as editing capabilities. The centerline extraction is done in two passes, with the first pass extracting topology of the image, then with the topology information used in the centerline defining to handle problems of overlapping strokes at junctions, which should be many junctions. This latter process can be done by representing image pixels with splats and extracting a topographical mapping between these splats and the centerlines.

As used herein, pixels can correspond to particles that are processed by the vectorizer for image pixels. In some of the processes, "particle" data structures are stored that being with representations of pixels but are changed by the processes.

Centerline Extraction

Part of the process of vectorization is extracting centerlines, the zero-width lines representing the centers of the strokes that are output as a final step of vectorization. Centerline extraction, done as described herein, overcomes the problems caused by using locally defined methods that tend to fail at junctions, by using more globally aware methods that are capable of detecting the difficult regions and treat them accordingly.

Initially, the vectorizer initializes a particles data structure so that each particle corresponds to a pixel. Not all pixels need be represented, as an image can be partially vectorized. A particle data structure ("particle" for brevity) includes fields for its pixel's properties, such as colors, position in the raster, and neighborhood information. The particles represent a direct mapping of the raster representation. An operation defined at the image level (such blurring, down/up sampling, etc.) would have an equivalent operation at the particle level.

In one of the approaches described herein, pixels are represented as particles that can move, change size, change associations, etc. and so although the actual physical mechanism is that a hardware and/or software image processor component modifies data values of a particle, such as its location in the image, it can be logically described as the particle "moving" because it has a "goal" of getting to some other place in the image or otherwise transform itself and become "aware" of changes. It should be understood that particles do not become self-aware, but that this is a convenient explanation of what the image processor does.

The representation of a particle retains information about the source pixel, such as its original position, color value, and neighborhood information. Thus, a set of particle representations (a list, array, table, database, etc.) can represent a direct mapping of the raster representation. Any operation defined at the image level (such blurring, down/up sampling, etc.) has an equivalent operation at the particle level. Moreover, in a series of successive processing steps, the particle representations can include extended pixel information, such as information about the global structure of the drawing from which the pixels are taken.

In a series of successive processing steps performed by the vectorizer, the particles extend their pixel's information, gaining awareness of the global structure of the image.

At an early step, the particle processor estimates/guesses, for each particle, the direction to the closest centerline from the particle. This can be done using local information (common to the pixels). Such direction will guide what is referred to herein as "the particle walk", an adapted mean shift clustering simulation, where particles are allowed to move toward the center of attraction of a local neighborhood. Similarly to a grassfire transform, a "front" of moving particles is stopped when those particles meet another front, resulting in a particle cloud that is assumed to approximate the centerlines of the drawing strokes.

Next, particles become the nodes of a dense graph generated from the cloud of particles in its converged state. The graph introduces a connected structure that has these purposes (among possibly others). First, it can be used to extract the global topology of the drawing by a coarsening process that respects the global connectivity but locally reduces the number of nodes. Topologically relevant points (TRP), such endpoints and junctions, as well as paths between them are therefore detected. Secondly, it allows information to diffuse within the particles cloud. The methods described herein takes advantage of this by associating each node of the graph with the paths between the TRPs, resulting in a topological segmentation of the whole drawing. Thirdly, it allows the computation of point-to-point shortest paths that, combined with a smart choice for the penalties of the edges, allows the tracing of centerlines inside the particle cloud.

In a late stage of processing, the vectorizer uses the topological segmentation to address the problem of overlapping strokes at junctions. Each junction can be processed in the following manner. A pair of junction branches is selected, and the particles semantically attached to them are isolated from the rest. Ideally, this creates the situation of a drawing where only a single stroke is drawn, and no influence from other strokes can spoil the centerline extraction.

Following the combinatory logic, all possible pairs of branches are isolated and the corresponding centerlines are extracted. In the last step, the junction valence and the candidate centerlines are analyzed, producing a labeling of the junction within a discrete set of junctions types, and the appropriate combination of centerlines is chosen as the final result.

Splats Representation and Rendering

The centerline extraction phase produces a final configuration of centerlines and a segmentation that topologically maps these centerlines with particles (and therefore the image pixels).

In this phase, a topographical mapping is derived; the particles are not only labeled so that they are each associated with the drawing stroke to which they belong, but also where exactly they are located within the stroke. This is illustrated in FIG. 8. Moreover, by applying splatting, the particles acquire rendering capabilities.

With splatting, each pixel is rendered as a 2D disk, positioned at the pixel location and with the appropriate radius and opacity falloff that produce an alias free rendering. The animation system might provide a user interface to allow editing, where some edits comprise changes to shapes of the centerlines. Such changes are propagated to the attached splats, influencing their position and shape.

Three-Step Process

In the three-step process described hereinbelow, (1) a low-level stroke analysis by particle clustering is done, then (2) a topological analysis is used for vectorization with (3) a hybrid storage of the results. This allows for efficient representation and optimal preservation of aspects of an input drawing without requiring pre-processing, such as smoothing, of the image.

Given a standard digital scan of a line drawing at an arbitrary (i.e., the desired) resolution, an image processor using this three-step process will perform low level stroke analysis by particle clustering. The initial stroke analysis is formulated as a self-organizing particle clustering algorithm. First, all foreground pixels in the scan are identified using a predetermined color model of the paper background. Each foreground pixels gets assigned a particle, with mass, color, and further properties based on the color of the input pixel. A pseudo-physical particle simulation then contracts and clusters nearby particles in order to separate and identify strokes from each other. Each resulting cluster represents a stroke of the drawing. The contracted particles are then connected with each other to form a low-level connectivity graph of the drawing.

Given the graph of the clustered particles, the image processor first identifies end points of strokes. Using these endpoints, the graph is iteratively coarsened until the high-level topology of the graph, i.e., individual strokes, junction points of the drawing between different strokes, etc. can be extracted. By an iterative stroke removal and recomputation of the clustering at junctions, the image processor can identify exact junction positions even in complex situations. FIG. 9 illustrates this junction position identification process.

After that is done and the junctions are identified, the image processor creates a hybrid data structure for representing the drawing. From the graph topology, junction points, etc, the image processor reconstructs a vectorized curve (e.g., piece-wise polynomial representation or the like) for each stroke. With each vectorized stroke, additional parameters can be stored, such as drawing speed, pen pressure while drawing, etc. Each input pixel is then represented by an elliptical splat and stored with a parameterized position with respect to its corresponding vectorized stroke curve. This data structure stores the high-level, vectorized stroke information as well as the individual stroke texture at maximum detail and allows for archiving, editing, and re-rendering line-based drawings with a quality not previously possible for so many situations.

For archiving, the hybrid representation is preferred over a separate, decoupled scan and vectorization, because the process combines information into a single consistent data structure. For modification/editing, digitized hybrid-representation drawings can be edited while preserving important characteristics of the original drawing. For example, one could easily apply corrections such as modifying the shape of a character's head, eye, or the body pose. The texture of the original drawing would be perfectly preserved. In a similar way, it is possible to re-render the same line-drawing, but with a different pen thickness, texture, colorization, etc. New strokes could be added that match the texture and style of the overall drawing.

Interpolation also becomes easy. For example, given two or more drawings in the hybrid representation, a processor can interpolate and morph between these key frames, by interpolating the vectorized shape as well as the texture of the single strokes.

Hybrid Representation

In some vectorizers, pixels are represented by more than a pixel location and a pixel color value, but also include additional properties, such as an indication of a global topology (e.g., which segment the pixel belongs to, where segments correspond with strokes, location of the pixel relative to its segment's centerline, etc. In such a vectorizer, a hybrid representation of an image might be used for storage and/or conveyance of an image. This would be useful for concept art processes, cleaned up key-frames for inbetweening, etc. The hybrid representation captures important characteristics and the appearance of a drawing, such as the individual strokes drawn by the artist, high quality texture, up to properties such as drawing speed or pen pressure. Besides pure digitization and archiving, this representation allows for several new applications, such as realistic editing of line drawings after digitization, automatic tight inbetweening and interpolation of shape and texture between key-frames, re-rendering of digitized images with different realistic stroke styles and textures, to allow for style transfer from image to image.

From the final extracted centerlines and the stroke segmentation, the vectorizer can create a hybrid vector- and splat-based representation of the drawing. The segmentation defines the mapping of pixel representatives, $G_j$, to their respective centerlines, $C_i$. The local coordinates $c_{ij}=(t, d)$ are given by the parameter value t of the point on $C_i$ being closest to $G_j$, the distance, and an additional tangential component around stroke endpoints. For aliasing-free, high quality rendering line drawings, EWA-splatting GPU-based implementations for real-time rendering might be used.

The data structure thus augments a vector representation of line strokes with textures. In effect, an image processor that can generate these hybrid representations can convert the raster pixels into a more flexible graphical entity using radial basis functions, where each basis function is parameterized with respect to each corresponding stroke. Any editing operation performed on a stroke centerline is then realistically transferred to the stroke texture as well.

Besides advanced editing, this combined representation of high- and low-level image information lends itself to use in a novel digitization process. Starting with a simple raster scan, higher level information is reconstructed in three successive phases, until the full global topology of the drawing is recovered. An initial clustering process computes a graph-based representation of the strokes in the drawing. This cluster graph is then analyzed in order to extract the global topology and to segment the drawing down to the pixel level into the individual strokes. One feature of the final analysis phase is the possibility of selectively removing individual strokes. This enables an accurate detection of centerlines and junction points by an iterative exploration of different stroke configurations, a process referred to herein as "reverse drawing".

Applications of this process include archiving line art such as classical sketches and 2D animation drawings, story boards and concept art, realistic texture-aware editing in digital post-production, providing a basis for automatic inbetweening of key-frames and other applications.

Detailed Example of a Vectorizer and Image Processor

It is assumed for many examples herein that the input to the vectorizer is a raster scan of a pencil or ink drawing. One challenge for drawings that are used in later processing steps is the consistent processing of raster scanned, low-level pixel data on the one hand and abstracted, higher-level curves on the other hand.

Example of Hybrid Representation

In a specific example of a hybrid representation, standard parametric curves are used as the basic representation of stroke centerlines. Each centerline can be defined by a Catmull-Rom spline $C_i(t)$, $t \in [0,1]$, but other parametric curve types are possible. The network of stroke center lines forms the "stroke graph" of the drawing. An editor can beneficially use the stroke graph and rasterized pixel data.

In this representation, the square pixels of a raster image are lifted to a higher-order representation using radial basis functions, based on EWA splatting or other techniques. Examples of such techniques are illustrated in [Zwicker]. In that approach, a Gaussian $G_j$ is represented for the center of each pixel $p_j$ and that more flexible graphical entity is used, supporting arbitrary affine deformations and rendering with higher order interpolation schemes. This is a desirable property when editing the shape of lines (e.g., bending a straight line) or rendering zoomed views of a drawing.

Second, with each pixel representative $G_j$, coordinates $c_{ji}:=(t, d)$ are stored, which are relative to the pixel's stroke centerline $C_i$, where t is the curve's arc length parameter at the point $C_i(t)$ closest to the center of $G_j$, and d is the corresponding signed distance in normal and tangential direction. The tangential component is nonzero only for $G_j$ located around stroke endpoints. Note that at junctions between several strokes $C_i$, where a unique mapping is not possible, an image processor can store coordinates $c_{ji}$ for each such stroke. From these coordinates, it is also possible to infer additional parameters, such as the local stroke width.

Figure 10:
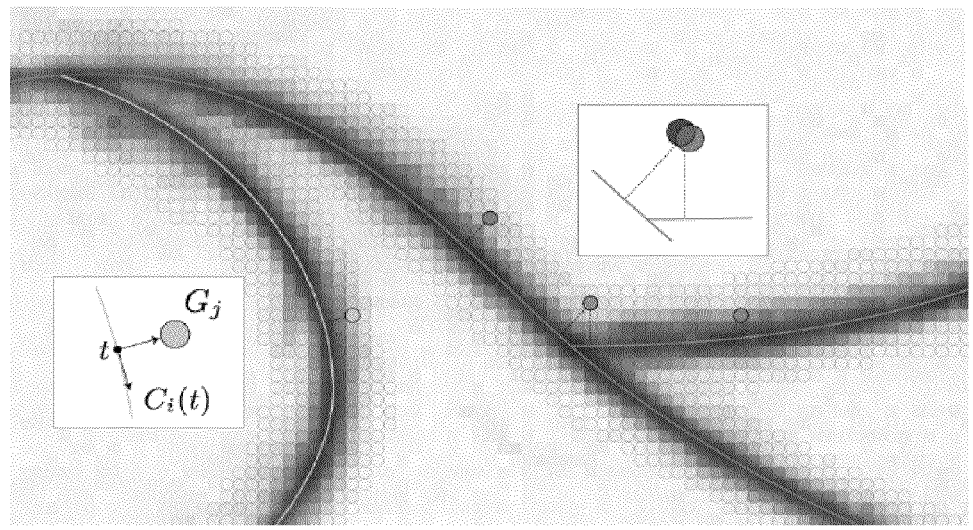
FIG. 10 is an illustration of a hybrid representation.

FIG. 10 illustrates such a hybrid representation. In an example data structure for storing a hybrid representation, the data structure might encapsulate the following items (and possibly others):

raster array (could correspond to the original input)

stroke table, providing a listing of the strokes, each stroke represented by a parameterization of the stroke's curve and/or centerline, its endpoints, etc.

segmentation map mapping areas of the input image to particular strokes junction table (or graph) indicating which strokes join to which other strokes table of pixel locations relative to corresponding centerlines (perhaps the direction and distance from a pixel to its centerline, for each pixel being considered)

Digitization

Generating the above representation from a line drawing can be a bottom-up approach, starting with a raster scan of a drawing, which contains low level information about pixel color only. In each step, the image processor successively extracts higher level information from the available data, until the full (or desired) representation has been created. Three steps of an example process will be described.

Figures 16A, 16B, 16C, 16D:
FIG. 16 is a centerline extraction in the face of a noisy input image.

1. Cluster Graph Construction. Initially, the only information available to an image processor that is to generate the full representation (or desired representation, where a less than full representation is sufficient) is the pixel representatives $G_j$. From the $G_j$, the image processor can infer first information about the approximate location of centerlines without necessarily identifying individual centerlines. Direct vectorization from unprocessed pixels often leads to inaccurate centerline estimates in ambiguous regions, where strokes are very close to each other or branching (as illustrated in FIG. 11), or where the stroke texture is noisy (as illustrated in FIG. 16). For disambiguation, the engine will infer information about the approximate location of centerlines from the pixel representatives.

The image processor guesses, for each $G_j$ being processed, about a centerline location based on the image gradient, and initiates a self-organizing clustering process, where those $G_j$ with a "confident" guess move towards the centerline and propagate their confidence to neighboring pixels, wherein a "move" can be a virtual operation denoted by a change in a stored location value for a pixel representative. Denoting this gradient at a pixel's original image location as $\nabla_j$ in the following description, this clustering step can be considered a particle simulation for gradient-based, continuous skeletonization. After this process, the $G_j$ are clustered approximately at the stroke centers.

For higher level topological analysis of these clusters, the image processor then generates a cluster graph. This graph is created by adding connectivity information to the clusters: the pixel representatives $G_j$ become graph nodes, and weighted edges are created from each $G_j$ to its local neighbors, as illustrated in FIG. 12. For simplified notation herein, the symbol $G_j$ should be considered synonymous with Gaussians in the context of rendering and for the graph nodes during graph analysis. The weight of an edge is then chosen such that it expresses the probability that the centerline of the stroke is passing through the two adjacent $G_j$, based on properties such as the initial gradient $\nabla_j$ (the guess about the direction to the centerline), pixel color (the "weight" of a pixel), and valence in the graph.

2. Topological Analysis. Based on the cluster graph, further topological analysis of the drawing is performed. A first step computes the global topological skeleton by identifying stroke endpoints, junctions and their connectivity as illustrated in FIG. 12. The information can be extracted from the cluster graph by topology-preserving iterative coarsening. Each connecting edge between these topologically relevant points then corresponds to a stroke segment in the drawing, so that in a second step we can segment the pixel representatives $G_j$ accordingly. This segmentation is performed by propagating the global topology information through the graph until all $G_j$ are assigned to a topological edge.

3. Reverse Drawing. After the topological analysis and storage of that result, the image processor can determine the approximate location of junctions to derive a first mapping of the pixel representatives to their corresponding stroke segments, $S_i$, and then accurately reconstruct the centerline curves, $C_i$, the junction positions, and how curves adjacent to a junction meet. For local techniques based on skeletonization, which do not consider non-local information about the topology of the drawing, an accurate reconstruction of junctions is difficult due to the ambiguous local appearance between different types of junctions and strokes of varying thickness and is bound to fail due to inherent ambiguities. Using the presently described global topology and segmentation of the pixels, however, junctions can be classified by reverse engineering the drawing process.

Figures 12A, 12B, 12C, 12D:
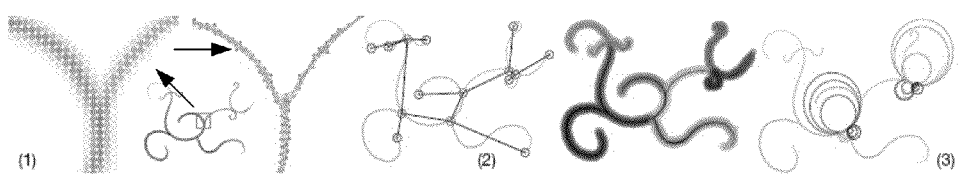
FIG. 12 is an illustration of stages of a vectorization process.

FIG. 12 graphically illustrates these steps. FIG. 12(a) illustrates how a complex line drawing in a rasterized form is represented as pixel representatives (on the left) and the clustering process results in the cluster graph on the right of FIG. 12(a), with representatives clustered around a Y-junction of the drawing. FIG. 12(b) illustrates topological analysis that identifies endpoints, junctions and the global connectivity of the drawing and the vectorizer can segment pixels accordingly. FIG. 12(c) illustrates a reverse drawing process usable for computing accurate centerlines and junctions. FIG. 12(d) illustrates a curvature-based junction classification.

Without global knowledge about the order of strokes and the junction types, these ambiguities render it impossible to find a faithful vectorization. These properties can be recovered by reverse engineering the drawing process. Using the drawing structure and pixel segmentation from the topological analysis step, we can selectively remove strokes at a junction. This allows the image processor to explore all possible stroke configurations in order to find the most likely drawing order (e.g., Y- or T-junctions). This classification of the junctions then enables a considerably improved tracing of centerlines and an accurate positioning of junctions.

Figure 13:
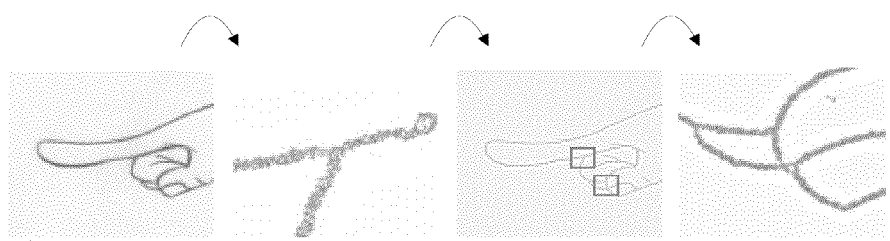
FIG. 13 is an illustration of a result of clustering for a non-segmented input image.

Using the drawing structure and segmentation, the image processor can selectively remove strokes adjacent to a junction and trace centerlines between pairs of stroke segments only. This allows the image processor to possibly explore all possible stroke configurations in order to find the most likely classification of a junction (e.g., Y- or T-junction). This classification then enables an accurate placement of stroke intersections and leads to a considerably improved vectorization quality, as illustrated in FIG. 13. After the stroke graph comprising all centerline curves and junctions is computed, the image processor creates the final hybrid representation described above.

Figures 11A, 11B, 11C, 11D, 11E:
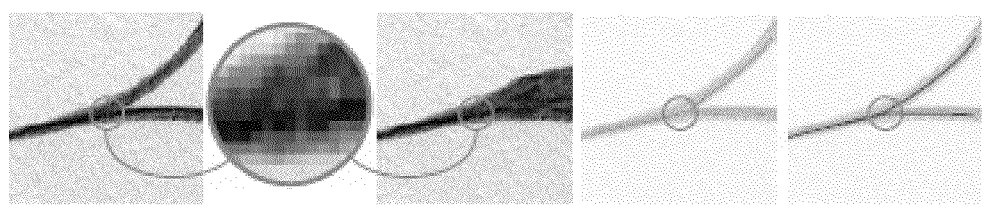
FIG. 11 is an illustration of a junction error that might occur with local vectorization and proposed junction correction.

FIG. 11 illustrates some of the problems that might occur with local approaches. Consider the local area within the circle in FIG. 11(a), which is expanded in FIG. 11(b). Using only local information, different types of junctions and strokes of varying thicknesses might not be distinguishable. As a result, the correct position of the Y-junction in this example might be missed, as illustrated in FIG. 11(d), whereas using the global topology of the drawing to classify the junction as a Y-junction, this allows for computation of a more accurate junction position, as illustrated in FIG. 11(e).

Detailed Example of a Vectorization Process

Given a raster scan of a drawing, a vectorizer will create a representative $G_j$ for every pixel as illustrated in FIG. 12(a). For computational efficiency, assume a coarse segmentation (e.g., using simple color thresholding or Gaussian Mixture Models of the paper background). This segmentation does not have to be overly accurate since one part of the following process is an effective outlier removal and is resilient to noise, as illustrated in FIG. 16. The first main phase is the generation of the cluster graph.

Cluster Graph

Pixel Clustering.

The clustering process in order to compute a first approximation of the centerline locations is based on the following observation: in a drawing made by pencil or ink, the image gradient $\nabla_j$ is either non informative, because the corresponding pixel is inside a stroke (or part of the background), or it is indicating the approximate direction to the center of a stroke, because it is located at the stroke boundary. Based on this observation, we initiate a self-organizing particle simulation, where pixel representatives with a large gradient (i.e., a sufficiently "confident" guess about the centerline location) are moving in the direction of $\nabla_j$. During clustering, unconfident pixels are "pulled along" (i.e., logically "moved" by the vectorizer as part of the process) by inheriting gradient information from a local neighborhood of confident pixels.

Purely local gradient estimates, however, are subject to noise and may vary strongly due to texture detail. Therefore, the image processor uses an averaging operator, which exploits the local density during the clustering process and implicitly corresponds to a voting approach among the confident $G_j$s. Initially, it sets the "motion" direction of all $G_j$ with a gradient $\|\nabla_j\| \geq \epsilon$ to $m_j = \nabla_j$ for some suitable $\epsilon$). A suitable $\epsilon$ might be 0.11, 0.1 or some other value. These $G_j$ then start to move with constant speed of $\|\nabla_j\|$ pixels per iteration step (or some other interval). During the clustering, the direction $m_j$ is then updated by averaging the original motion directions from all moving $G_k$ within a 1-pixel radius illustrated in Equation 1, where w controls the speed of the averaging process.

$$m_j = \frac{1}{1+w}\left(\nabla_j + w\sum_k \nabla_k\right) \quad \text{(Eqn. 1)}$$

Intuitively, as soon as a moving $G_j$ comes into close contact with other moving pixels, they exchange information about the most likely motion direction. More precisely, the image processor and/or vectorizer compares information from each pixel's corresponding data structure and copies or modifies data accordingly. This adaptively filters out effects from noisy gradients. Experimental data suggests that a low weight of w=0.1 is a good choice even for noisy images to prevent unnecessarily strong smoothing.

Stationary $G_j$ with $\nabla_j < \epsilon$ are pulled along by setting $$\nabla_j = \frac{1}{n}\sum_k \nabla_k$$

as soon as they are touched by a moving front of pixels. This process is iterated until opposite fronts meet and there is no clear consensus about the movement direction anymore ($\|m_j\| < \epsilon$). After convergence of the clustering, such as when 95% or some other proportion of the moving pixels has stopped, the traveled distance is stored as the approximate line radius with each $G_j$. The result of this step is a clustered cloud of pixels scattered around the approximate location of the centerlines; see FIG. 12(a). Note that outliers such as isolated particles can be eliminated quite easily based on the size of the local neighborhood.

Graph Construction.

The vectorizer then generates the cluster graph by adding a weighted edge $e_{jk}$ for each pair ($G_j$, $G_k$), where $\|G_j - G_k\| < 1.5$ pixels. A slightly larger threshold can be used here to increase the connectivity of the graph and to bridge small gaps that might be created during the clustering process. Note that the edge weights are chosen such that they reflect the (inverse) probability that a centerline passes through ($G_j$, $G_k$), i.e., edges with a high probability get assigned weights close to zero, while low probability edges get higher weights. In some embodiments, the vectorizer computes and stores a weight $w(e_{jk})$ of an edge as a linear combination of parameters for direction, textured-ness and valence.

1. Direction. Edge directions $d(e_{jk})$ perpendicular to the (normalized) initial movement directions $\nabla_j$, $\nabla_k$ should be preferred: $w(e_{jk})\nabla_j + d(e_{jk})\nabla_k$.
2. Textured-ness. Pixels with a stronger color $c(G_j)\tau[0, 1]$ should get a higher probability: $w_t(e_{jk}) = w_t(2 - c(G_j) - c(G_k))$.
3. Valence. Pixels inside the clusters (with a higher valence) should get a higher probability than pixels at the cluster boundaries: $w_v(e_{jk}) = w_v/(\text{val}(G_j) + \text{val}(G_k))$.

The final edge weight is $w(e_{jk}) = w_d(e_{jk}) + w_t(e_{jk}) + w_v(e_{jk})$. The resulting cluster graph can be used as the basis for a topological analysis of the drawing. It should be noted that while the example here is often a drawing, other images might be processed as well. Experimental data might suggest that the reconstruction quality is not very sensitive to the exact choice of weights. Values of $w_d = 1.0$, $w_t = 1.0$, and $w_v = 0.5$ can work well. The resulting cluster graph is the basis for the following topological analysis of the drawing.

Topological Analysis

Topological Skeleton.

The global topology data structure of a drawing represents three components: the endpoints of strokes, junctions where several strokes meet, and the global connectivity between these points. Using the cluster graph generated by the process above (or otherwise available to the vectorizer), these components can now easily be computed.

Finding good endpoint representatives in an unstructured cluster graph is a difficult problem. Here, we can exploit the fact we noted that endpoints of strokes are characterized by an anisotropy of the local neighborhood in the cluster graph. This anisotropy can be analyzed by tracing the center of mass of local subgraphs of increasing size: for a graph node $G_j$ and neighborhood radii of size [1, 2, ..., n], compute the center of mass of all nodes $G_k$ within each of these subgraphs, and then trace the resulting centers of mass. For each $G_j$ inside a stroke, this trace is an unstructured point cloud, while for an endpoint it is a line or a curve. The shape of the trace can be captured by a variant of the triangle inequality. We compute the ratio l/d of the length/of the trace to the distance d between the first and the last center of mass. This procedure results in a rating $r(G_j) \leq 1.0$ for every graph node, which is close to 1.0 for possible endpoints with a linear trace. To identify actual stroke endpoints, we first select the 10% of nodes with highest scores as candidates, and then accumulate ratings at local maxima by an iterative, inverse diffusion process with a simple update rule: $r(G_j) = r(G_j) + r(G_k)$ and $r(G_k) = 0$ if $r(G_j) > r(G_k)$. After convergence, the endpoints have rating $r(G_j) > 0.0$, while all other nodes have a zero-rating. Note that since all computations are performed on the cluster graph rather than in image space, this approach robustly handles situations such as nearby strokes, which are difficult to process for purely image-based approaches.

After the endpoint detection, topologically relevant junctions of the skeleton can be detected. The vectorizer can do this using a graph coarsening process, which can be considered a vertex-based version of a reverse delete process for minimum spanning tree construction, with a localized acceptance criterion as shown by [Kleinberg and Tardos 2005]. Graph edges are rated on their likelihood of belonging to the centerline according to criteria defined above, and this edge weight can be aggregated by adjacent vertices. Vertices are processed in a greedy fashion, with highly weighted vertices that have a correspondingly low probability of belonging to the centerline considered first. For each vertex, a test is performed to determine whether the local subgraph within a radius of the vertex corresponding to the previously computed stroke width is still a single connected component. If the test result is positive, the corresponding node is deemed topologically irrelevant and can be removed from consideration. The procedure terminates when no further vertices meet this criterion.

Figures 14A, 14B, 14C:
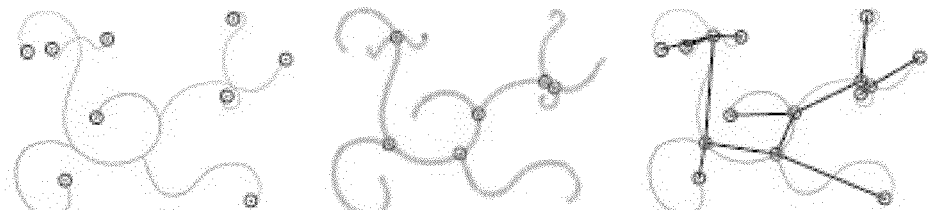
FIG. 14 is an illustration of detection of endpoints (FIG. 14(a)), junctions (FIG. 14(b)), and global connectivity (FIG. 14(c)).

The result of this simple iterative edge removal is a coarsened cluster graph, where the remaining graph nodes can be characterized according to their valence. Nodes with valence 1 are endpoints, valence 2 corresponds to connections between the topologically relevant points, and nodes with valence 3 or more are junctions. The final global connectivity of the drawing is extracted by collapsing valence 2 nodes until only endpoints and junctions remain, as illustrated in FIG. 14. As a special case, loops in a drawing can be broken into two segments by adding a valence 2 junction.

Drawing Segmentation.

Once the topological structure (and hence each stroke segment, $S_i$) is known, the vectorizer can compute a first assignment of the original input pixel's $G_j$ to the respective strokes. By exploiting the connectivity information of the cluster graph, an accurate segmentation down to the level of each individual pixel can be obtained by, for example, diffusion-based propagation of the stroke indices from the topological edges over the coarsened cluster graph to the full cluster graph. A corresponding segmentation is shown in FIG. 12(b).

Reverse Drawing

A last step of the vectorization process is to compute the actual stroke centerlines and junction positions. One of the key insights of our work is that, in order to compute these positions accurately, some global knowledge about the drawing is used, at least to determine a most likely configuration and order in which strokes around a junction have been drawn. A classification for each junction can be determined when the adjacent stroke segments meet in a T-, Y-, or higher valence configuration. This labeling is used because the way strokes merge differs considerably for these different types of junctions. For example, T-junctions, where 3 topological stroke segments join, are generally created from one continuous stroke (comprising two stroke segments) and a 3rd segment joining approximately at a right angle. Y-junctions, on the other hand, are more likely to be drawn from two smoothly joining strokes. Without considering this information, the junction points as well as centerlines might not be reconstructed properly. With the topological segmentation of the drawing, the vectorizer can effectively determine the reverse of the drawing process and explore different stroke configurations by iterative centerline tracing to find the most likely configuration for each junction.

Centerline Tracing.

Since the edge weights in the cluster graph have been chosen such that they reflect the probability of the centerline passing through an edge, a basic centerline estimate can be easily found by computing the shortest path between topologically relevant points. Due to the uneven distribution of points in the cluster, the initial centerlines might be jaggy. A filtering step can be applied that combines Laplacian smoothing and a data smoothing term, which pulls the centerline points to the local center of mass.

Junction Classification.

The reverse drawing procedure classifies junctions. Using the pixel-accurate segmentation, strokes segments can be selectively removed from a drawing and a "trace centerlines" process performed. Of course, the segments do not actually have to be removed, but if it is known where the segments are, they can be effectively masked in the process. At junctions, this enables the vectorizer to find the most likely configuration in which strokes segments have been drawn (i.e., which segments might belong to a single continuous stroke). For example, smoothly joined stroke segments are generally more likely to belong together than strokes joining at a right angle. By exploring the space of all possible configurations (or most possible configurations), the vectorizer can automatically classify junctions as T-, Y-, X- or higher valence junctions and exploit this information for accurately positioning the centerlines and junction points.

The junction classification procedure might proceed as follows. For each junction, first perform the following steps for all pairs $(S_i, S_j)$ of adjacent strokes (of course, some points, lines, strokes, pairs, etc., might be omitted from this process, so "all pairs" means all pairs being operated on). First, remove all $G_k$'s that do not belong to $S_i$ or $S_j$. Then, generate a new "local" cluster graph for those two stroke segments and trace a centerline $C_{ij}$ from the endpoint of $S_i$ to the endpoint of $S_j$.

For a robust estimation of the curvature $\kappa_{ij}$ of a centerline $C_{ij}$ at a junction, the vectorizer might use a multi-scale approach that considers the local stroke thickness. The vectorizer first picks the point on the centerline that is closest to the junction position. Then, two other points are chosen by traversing the centerline from the first point into the two opposite directions, with distances 1, 2, and 3 of the local stroke width. At each step, the circumcircle of the triangle defined by the three points is computed, and curvature $\kappa_{ij}$ is then set to be defined as an average of the inverse circle radii.

Based on these curvature values, the most common type of junctions with valence 3 can be classified as T-junctions if there is one centerline (the top of the T) with a low curvature while the other two have similarly high curvatures, or as Y-junctions if one centerline (the top of the Y) has a high curvature while the other two have similarly low curvatures. This characterization translates into a simple criterion or ordering the curvatures in increasing order ($\kappa_{min} \leq \kappa_{mid} \leq \kappa_{max}$) and then if $(\kappa_{mid} - \kappa_{min}) < (\kappa_{max} - \kappa_{mid})$, the corresponding junction is classified as a Y-junction, otherwise as a T-junction.

Junctions with a higher valence are handled by a greedy centerline selection procedure. First all centerlines are ordered according to their curvature. Then the following procedure is iterated:

1. Remove from the list the centerline with the lowest curvature and mark the corresponding stroke segments as processed.
2. Check if there are unprocessed stroke segments left. If there are, loop back to step 1.

Figures 15A, 15B, 15C, 15D:
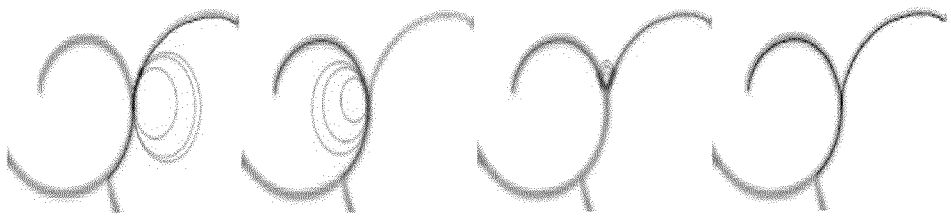
FIG. 15 is an illustration of stages of a junction classification.

Based on the above classification of junctions, a plausible configuration of the centerlines in the proximity of the junction is generated. The junctions, which up to this point have been expressed only as a topological connotation, are then realized into topographical entities by intersecting the selected centerlines to find the precise location of the junction, as illustrated in FIGS. 15(c)-(d).

A final post-processing step might combine the selected centerlines around each junction with those of its neighbor junctions. Due to the procedure for junction classification, a topological edge connecting two junctions is associated with two (nearby) centerlines, one originating from each junction. Those centerlines can be merged by interpolation so that a single smooth centerline is obtained.

Alternative Embodiment

The above described processes for pixel clustering, topological analysis and reverse drawing and centerline reconstruction might be instead done as follows.

Alternative Clustering for Stroke Disambiguation

The clustering process generates a cluster graph. The cluster graph is usable by an image processor to, for example, compute a first approximation of the centerline locations. The cluster graph is generated by considering the pixels, $p_i$, of a raster input image.

The pixels can be roughly classified into two categories, depending on their respective image gradient, $\nabla_i$. One category is pixels with small gradients, which do not carry sufficient information about the stroke center, while the other category is pixels with large gradients, which provide a more "confident" guess (modulo noise) about the centerline location.

Figure 18:
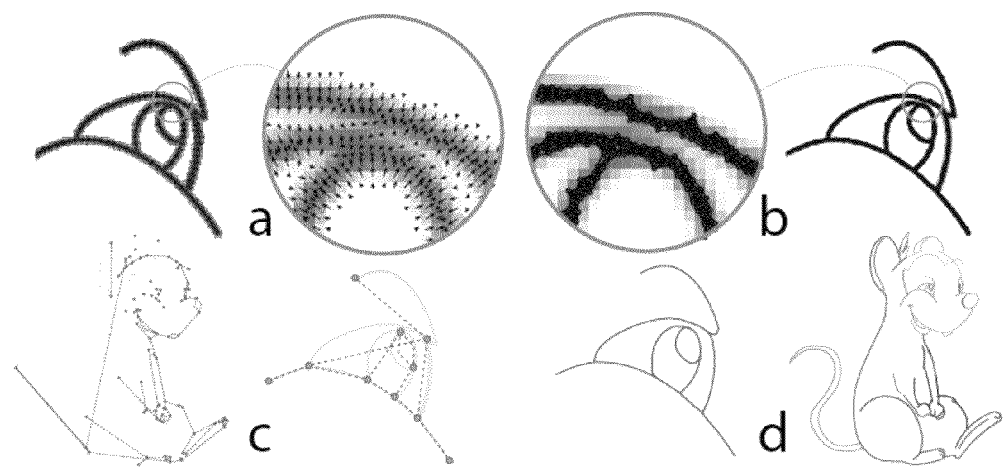
FIG. 18 illustrates disambiguation of nearby strokes using gradient fields.

FIG. 18 illustrates this. Nearby strokes to a pixel can be disambiguated by moving the pixels following the gradient field (FIG. 18($a$)). The separated stroke pixels after clustering are shown in FIG. 18($b$). From the clusters, a cluster graph is generated, which enables a topological analysis of the drawing as in FIG. 18($c$). Based on the global information in the topological skeleton, accurate vectorized centerlines and junctions can be computed as in FIG. 18($d$).

Accordingly, a vectorizer will classify each pixel $p_i$ as either stationary pixel or a moving pixel by thresholding the gradient norm, i.e., by classifying into set $S=\{p_i | \|\nabla_i\| < \epsilon\}$ and set $M=\{p_i | \|\nabla_i\| \geq \epsilon\}$. The threshold, $\epsilon$, should be set to be above the noise level of the background gradients of the input image. However, the vectorizer might be insensitive to the particular choice of $\epsilon$. In some embodiments, $\epsilon$ is fixed to 10% of the maximal gradient length.

Using this approach, the vectorizer accounts for stroke clustering by having confident pixels $p_i \in M$ "move" towards the centerline (the direction of $\nabla_i$), and the stationary pixels $p_i \in S$ are pulled along by inheriting gradient information from a local neighborhood of confident pixels. Since such purely local gradient estimates are subject to noise and vary due to texture detail, the vectorizer can control the motion speed by an averaging operator, which results in pixels moving as connected "fronts" from each of the stroke boundaries. Preferably, the motion direction is not averaged, since this tends to cluster pixels belonging to a single stroke into disconnected blobs.

Initially, the vectorizer sets a motion vector, $m_i$, of all $p_i \in M$ to $m_i = \nabla_i$. The motion speed is then updated at each iteration by projecting onto $\nabla_i$ the direction $d_i$, which is obtained by averaging the original motion directions from all moving $p_j \in M$ within a 1-pixel radius as indicated in Equation 2, where n is the number of considered neighbors.

$$m_i \leftarrow d_i^T \nabla_i^2, \text{ with } d_i = \frac{1}{n+1}\left(\nabla_i + \sum_j \nabla_j\right) \quad \text{(Eqn. 2)}$$

A stationary pixel $p_i \in S$ is removed from S and added to the set of moving pixels, M, as soon as it is within a 1-pixel radius of at least one moving pixel. Other variations are possible. The stationary pixel is then "pulled along" by applying the same update rule as in Equation 2. Conversely, a moving pixel $p_i \in M$ is removed from M and added to the set of stationary pixels S if $\|m_i\| < \epsilon$, which means that opposing fronts of pixels meet and there is no longer clear consensus about the local motion direction. The clustering process terminates when the amount of moving pixels drops below 1% of the initial set, or some other limits. In test cases, the termination occurs after 20 or fewer iterations.

Once the vectorizer completes the clustering process, it can output (store, transmit, pass to another process as data, etc.) data resulting from the clustering process. Clustering typically results in a "contraction" of stroke pixels around the approximate location of the stroke centerlines, as shown in FIG. 18. Outliers, such as remaining background pixels and isolated pixels, can be eliminated by removing those pixels that remained stationary through the whole clustering process or that have less than two neighbors within a 1-pixel radius, or meet some other suitable criteria.

The vectorizer stores, in memory or other electronically accessible storage, representations of values for a traveled distance of each pixel, typically stored as an approximate local stroke radius, $r_i$. For a conservative estimate, the vectorizer might set $r_i$ equal to be the maximum $r_j$ of all $p_j$ within a 1-pixel radius. This estimate of the local stroke thickness is stored or maintained for later use by other steps performed by the vectorizer.

4.2 Topological Analysis

Figure 19:
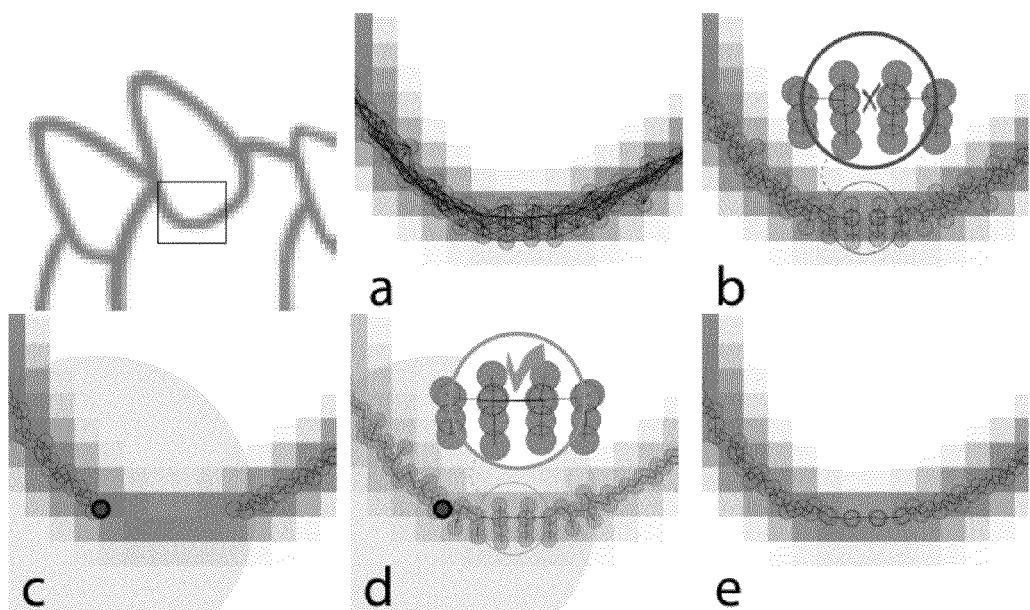
FIG. 19 illustrates graph coarsening.

In the topological analysis phase, the vectorizer constructs a graph structure (the "cluster graph") by connecting each clustered pixel to all neighbors within the local stroke thickness. A weighted edge $e_{ij}$ is added for each pair $(p_i, p_j)$, where the Euclidean distance $D(p_i, p_j) \leq r_i$, as illustrated in FIG. 19($a$). The weight $\omega(e_{ij})$ of an edge is simply determined from $\omega(e_{ij}) = D(p_i, p_j)$.

The topological skeleton (endpoints, junctions, connectivity) of the drawing is then computed by topology-preserving coarsening of the cluster graph. First, a minimum spanning tree (MST) of the graph is computed. [Kleinberg and Tardos 2005] provides an example of computing this. Due to the dense pixel clustering, the MST is characterized by a number of main branches with many very short branches ("twigs") that contribute to the stroke width/detail, but not ultimately to the topological structure that is relevant. FIG. 19($b$) illustrates this.

In FIG. 19, graph coarsening is shown, wherein from the cluster graph (FIG. 19($a$)), the minimum spanning tree is computed (FIG. 19($b$)), and the leaves are iteratively removed until convergence (FIG. 19($c$)). The circle in FIG. 19($b$) shows a case where the MST breaks the connectivity of a loop in the drawing. Such gaps are closed by computing local MST (FIG. 19($d$)). The final coarsened graph is shown in FIG. 19($e$).

In order to isolate the main branches, the leaves of the MST are iteratively pruned until one of two criteria is met:

1. The overall number of removed leaves per iteration converges (becomes constant). In the initial iterations, leaves will be present at the ends of main branches, and at the end of twigs. Once all the twigs have been eroded, each subsequent iteration will only remove the ends of the main branches. Therefore, the condition of the number of leaves removed per iteration becoming constant coincides with the point at which all twigs have been pruned and only branches remain.
2. For each pruned leaf $p_i$, the vectorizer keeps track of the history of the previously pruned, direct predecessor leaf. This enables it to compute the Euclidean distance of $p_i$ to the most distant predecessor leaf $p_f$ on the same branch of the MST. The vectorizer stops pruning if the distance between the two graph nodes is larger than the local stroke thickness, and hence $p_i$ is likely to belong to the main branch ($D(p_i, p_f) > r_i$).

Closed loops in the drawing require special handling, since the MST will cut them into at least two main branches and create gaps of width approximately $2r_i$ due to the stopping criterion described above. This is illustrated in FIG. 19($c$). These gaps are closed by computing a local MST of depth $4r_i$ at the endpoints of the global MST, and again applying the local pruning of leaves. The vectorizer can use a slightly larger depth to account for slightly inaccurate estimates of the local stroke thickness. To ensure that these local MST are compatible with the global one, the weights of the main branches in the global MST are set to zero; the local MST will first pick those nodes, and then connect the isolated nodes, at the same time re-establishing the broken connection, as illustrated in FIGS. 19(d)-(e). After this step, all the remaining leaves of the graph are endpoints of strokes.

The final topological skeleton of the drawing can then be obtained by collapsing all nodes of valence 2 in the graph. Nodes of valence 1 then correspond to stroke endpoints, nodes of valence of 3 or more correspond to stroke junctions, and the graph edges represent the topological stroke segments in the drawing. This is illustrated in FIG. 18(c).

Centerline Reconstruction

The vectorizer can then reconstruct the vectorized stroke centerlines in two steps: (1) basic centerline tracing and (2) refinement of centerlines around junctions.

Basic Centerline Reconstruction.

Given the cluster graph and the drawing topology, initial stroke centerline estimates can be computed as shortest paths between feature points (endpoints and junctions) that are connected by an edge in the topological skeleton. Since two feature points (for example, two junctions) may be connected by several stroke segments, the vectorizer is programmed to label all nodes of a segment associated with the shortest path as visited and iterate until no shortest path can be found anymore. This process is repeated for every pair of connected features points, until all edges of the topological skeleton have been considered.

Figure 20:
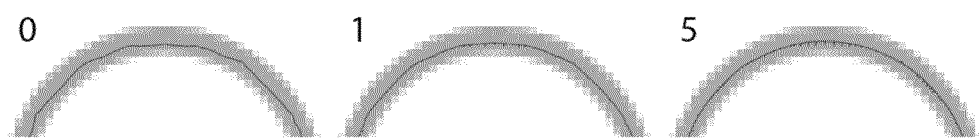
FIG. 20 illustrates smoothing for a centerline path after a number of iterations.

From the computed centerline paths in the cluster graph, smooth stroke centerlines are obtained by a data-driven smoothing operator, which moves the path along the local curve normal towards the center of mass of the clustered stroke pixels. For each point $p_i$ of a centerline path, a Gaussian weighting function is used to assign weights to the cluster pixels $p_j$ in the neighborhood, but other techniques might be used instead. The refined position of $p_i$ is then given as shown in Equation 3, where $c_i$ and $w_j$ are given as shown in Equations 4 and 5, respectively and where $n_i$ is an approximation of the local curve normal and $\sigma = r_i$ to adapt the weighting scheme to the local stroke thickness. This is illustrated in FIG. 20.

$$p_i \leftarrow p_i + (c_i - p_i)^T n_i^2 \quad \text{(Eqn. 3)}$$

$$c_i = \frac{\sum_j w_j p_j}{\sum_j w_j} \quad \text{(Eqn. 4)}$$

$$w_j = e - \frac{D(p_i, p_j)}{2\sigma^2} \quad \text{(Eqn. 5)}$$

In FIG. 20, smoothing is shown for the centerline path after zero, one, and five iterations.

Figure 21:
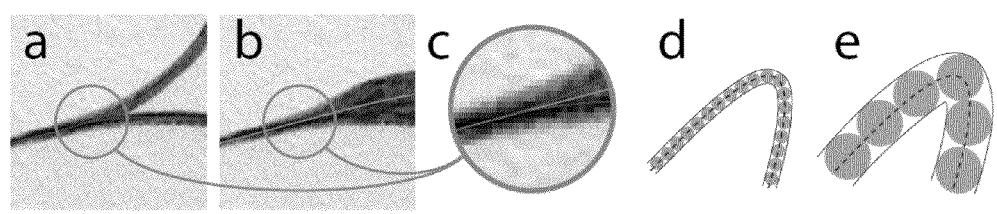
FIG. 21 illustrates the junction problem and stroke angle issue.

FIG. 21 illustrates the junction problem and stroke angle issue. The appearance of a junction (FIG. 21(a)) or a stroke of varying thickness (FIG. 21(b)) cannot be distinguished on a purely local scope (FIG. 21(c)). Hence, an accurate reconstruction of centerlines requires knowledge of the global structure of a drawing. FIGS. 21(d)-(e) illustrate the differing visual smoothness of pencil strokes with the same underlying trajectory (dotted line), but differing pencil thickness.

Junction Refinement by Reverse Drawing.

In the proximity of junctions, single strokes cannot be properly distinguished and local reconstruction fails due to inherent ambiguities, as FIG. 21 illustrates. The vectorizer solves this problem by utilizing the global information about the drawing topology and reverse engineering all possible drawing states at a junction in order to select the most likely configuration of strokes.

Figure 22:
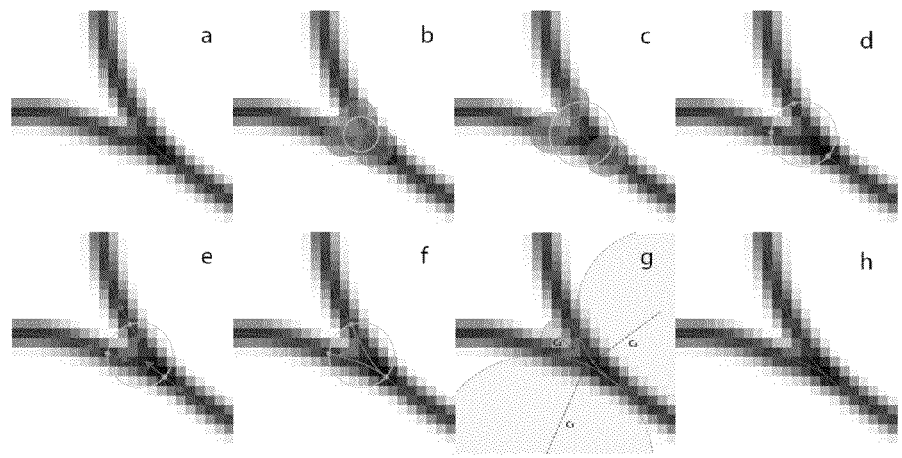
FIG. 22 illustrates reverse drawing.

The basic approach is to remove the ambiguous centerline estimates at junctions, and explore potential centerline configurations by fitting smooth curves to the incident strokes. Then the vectorizer evaluates the stroke angle at the junction, rates the likelihood of each configuration, and then chooses the most likely configuration. This procedure is illustrated in FIG. 22.

As illustrated there, to improve inaccurate centerlines at junctions (FIG. 22(a)), the vectorizer first removes those parts of the incident centerlines where the individual strokes overlap (FIGS. 22(b)-(d)). Given the directions of the incoming centerlines (FIG. 22(e)), smooth curves are fitted for each pair of centerlines (FIG. 22(f)), their curvature is evaluated (FIG. 22(g)), and the final centerline configuration is selected (FIG. 22(h)).

The vectorizer first removes the centerlines at a junction in regions of overlapping strokes. For each junction, it starts by creating a circle at the junction position with the radius corresponding to the local stroke thickness (FIG. 22(b), center circle). This circle represents the region of uncertainty (RU) about the centerlines' locations. Then, the following steps are iterated:

1. Intersect the RU with the incident centerlines.
2. For each intersection, generate a stroke-circle of radius equal to the local stroke thickness (FIG. 22(b); peripheral circles).
3. If stroke-circles overlap, the radius of the RU is increased, and the process iterated until the stroke-circles are free of intersections (FIG. 22(c)).

Those parts of centerlines lying within the final RU are discarded (FIG. 22(d)).

The next step is to create and evaluate new centerline candidates (CCs). The CCs are generated by fitting a smooth polynomial curve to each pair of incident centerlines (FIGS. 22(e)-(f)). The evaluation of CCs can be based on the assumption that centerlines with a small curvature are more likely to belong to a single continuous stroke than centerlines joining at sharp angles. To evaluate the angle at which centerlines join, the local stroke thickness is again taken into account. FIG. 21 shows a case where the same centerline trajectory can imply a turn of one curvature for a small brush (FIG. 21(d)) or a different, sharper turn for a larger brush (FIG. 21(e)).

Figure 23:
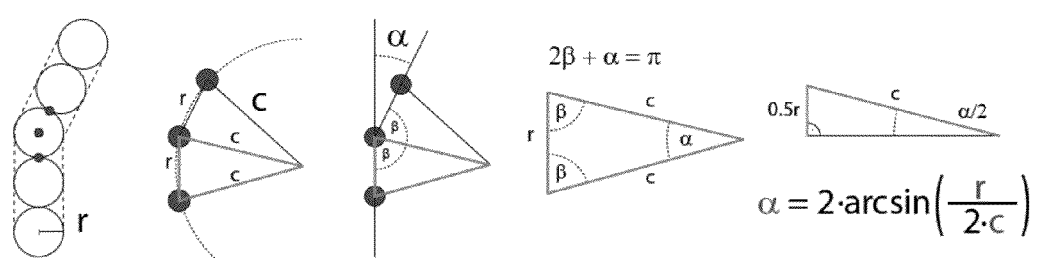
FIG. 23 illustrates geometric reconstruction of stroke angle from a local stroke radius and a fitted circle.

An approximation of the respective stroke angle under consideration of the local stroke thickness can be obtained by sampling the stroke centerline at three points with distance r (the local stroke radius) and fitting a circle, as illustrated in FIG. 23. The stroke angle, $\alpha$, is then by Equation 6.

$$\alpha = 2\arctan\left(\frac{r}{2c}\right) \quad \text{(Eqn. 6)}$$

To compute the stroke angle $\alpha_i$ of a centerline candidate $CC_i$, the vectorizer can sample the $CC_i$ uniformly with sample distance r according to the local stroke thickness, and then set $\alpha_i$ as the maximum stroke angle over the whole curve, as shown in FIG. 22(g). Then, the CCs at a junction are rated according to the following procedure:

1. $\forall \alpha_i$: if $\alpha_i > t$, then reject $CC_i$ as a sharp turn.
2. Sort remaining list of smooth candidates $CC_i$ in ascending order according to $\alpha_i$.

3. Sequentially accept $CC_i$ until all original centerlines are connected by at least one CC or the list is empty.
4. Finally, centerlines for which all candidates $CC_i$ have been marked as sharp turns in step 1 are considered to sink into the junction without being continued.

The threshold, t, that allows the vectorizer to distinguish between smoothly joining centerlines and centerlines that sink into a junction, has been empirically estimated as t=50°, but other values might be possible. The result of this reverse drawing procedure is accurate and smooth centerlines, with correctly placed junctions, as illustrated in FIG. 22(h).

Variations

Figures 17A, 17B, 17C:
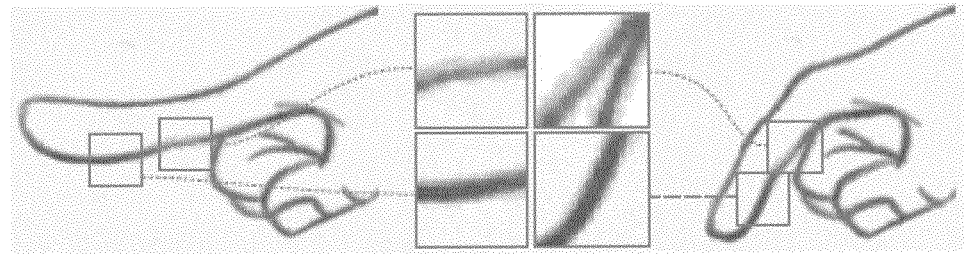
FIG. 17 is an illustration of image editing that can be performed with an image when centerlines have been extracted.

As has now been described, an improved vectorizer is provided in an animation and video processing and editing system. Using this, line drawings can be scanned and vectorized to allow for easy concept art, clean up, key-framing, and other operations, as illustrated by FIG. 17, for example. The result is a hybrid representation that captures important characteristics and the appearance of a drawing, such as the individual strokes drawn by the artist, high-quality texture, up to properties such as drawing speed or pen pressure. Besides pure digitization and archiving, this representation allows for several new applications, such as realistic editing of line drawings after digitization, automatic tight inbetweening and interpolation of shape and texture between key-frames, re-rendering of digitized images with different realistic stroke styles and textures (style transfer) and the like.

One of the main problems with conventional vectorization that has been identified is what is referred to herein as the "junction problem", which results in incorrect centerlines. Using the methods and apparatus described herein, that problem is solved. While some errors might be ignorable, having good junction locations is important for providing editable sets of vectors that look good when moved and animated. The problem is that when two strokes crosses, the information about their individual path is lost, due to the color values being clamped to a maximum or possibly for other reasons. If the goal was simply to render a set of vectors from the vectorization, the result might be acceptable, but when more is done with the image, these errors might become apparent and annoying. Most "local scope" approaches will fail to distinguish between a stroke getting larger and a bifurcation happening ahead of the local processing. Herein, a process that uses global information (information about the image dependent on more than just a local area around a junction) is described that provides better results.

In a specific embodiment of a two-step procedure, in order to obtain the centerlines (the vector lines that represent the skeletons of the drawing strokes), the topology of the drawing is extracted so that the image can be segmented and stroke crossings do not influence each other and thus be vectorized independently. As is described, particle clustering can be used to obtain the skeleton of the drawing, or other methods can be used. Graph coarsening can be used by a vectorizer to derive a global topology for a cloud of points.

In some cases, graph coarsening is done by a vectorizer using "successive neighbor" queries to detect endpoint of point clouds, where the center of mass of a neighborhood is computed for increasing radii, leading to a trace of the center of mass at different scales. For an endpoint, such trace tends to a straight line.

Many steps are amenable to parallelization and are suitable for implementation on a graphics processing unit (GPU). For example, a GPU might handle in parallel cluster graph construction and coarsening, local operations that are suited for distribution of workload might be located on multiple cores. If user interaction is required, it can be put at the end of the processing pipeline.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method, using a computer, for generating vector and digital representations of lines present in an input pixelated image, from a dataset corresponding to the input pixelated image, the method comprising:
   receiving the dataset corresponding to the input pixelated image in a computer-readable form;
   extracting a centerline of the dataset, wherein extracting the centerline includes:
      identifying a plurality of pixels in the dataset;
      estimating a direction from at least some of the plurality of pixels to an estimated centerline; and
      advancing the at least some of the plurality of pixels towards the estimated centerline;
   determining a topology of the lines in the input pixelated image, thereby forming topology data, the topology data comprising end points and junctions connected by a minimum spanning tree;
   using the topology data to identify locations of endpoints and junctions of at least some of the lines;
   determining stroke intersections, representing stroke intersection points or regions, wherein determining stroke intersections is done dependent on the identified locations of endpoints and junctions; and
   generating a vector representation of the input pixelated image, representing lines, line segments or curve portions that correspond to centerlines or reference lines for each of a plurality of strokes corresponding to lines formed by pixel color values of the input pixelated image.

2. The method of claim 1, further comprising:
   representing pixels by particle structures having size and location;
   generating a map of pixel clusters; and
   generating a graph of pixel cluster connectivity, wherein graph nodes correspond to endpoints or junctions and graph edges correspond to strokes.

3. The method of claim 1, wherein determining a topology of the lines in input pixelated image comprise determining lines in the input pixelated image using an iterative process considering pixel gradients.

4. The method of claim 1, wherein the vector representation is a portion of a hybrid representation that encodes for vectors corresponding to strokes and pixel color values and includes mappings of pixels to strokes.

5. The method of claim 1, wherein determining a topology of the lines in the input pixelated image comprises generating a particle clustering table having entries representing a particle cluster.

6. The method of claim 1, wherein determining a topology of the lines in the input pixelated image comprises:
generating a graph of coarse point clouds; and
using successive neighbors in a process of detecting point cloud endpoints, wherein a center of mass of a neighborhood is computed for increasing radii to provide a plurality of traces of the center of mass at different scales.

7. The method of claim 1, wherein determining stroke intersections comprises:
selectively masking segments of the input pixelated image as determined in a segmenting step; and
determining stroke intersections based on unmasked segments.

8. An image processor, implemented using at least one electronic computing element, comprising:
an input for receiving a pixelated image;
logic for generating a particle map from the pixelated image;
memory for storing intermediate results in computer readable form and sufficient storage for at least a part of the particle map;
logic for calculating pixel gradients and for modifying the particle map based on a set of stored rules about particle movement according to the calculated pixel gradients, wherein the stored rules include a threshold defining a boundary between a first group of non-moving pixels and a second group of moving pixels;
logic for sorting pixels of the particle map between the first and second groups according to the pixel gradients of the pixels and according to the threshold;
logic for extracting an initial topological skeleton from a modified particle map;
logic for segmenting the pixelated image into segments based, in part, on the modified particle map and/or the initial topological skeleton; and
logic for determining a vector representation of lines present in the pixelated image from results of the logic for segmenting and the logic for extracting, the vector representation including representations of stroke intersection points or regions, lines, line segments or curve portions that correspond to centerlines or reference lines for each of a plurality of strokes corresponding to lines formed by pixel color values of the pixelated image.

9. The image processor of claim 8, wherein the intermediate results represent pixels by particle structures having size and location, a map of pixel clusters, and a graph of pixel cluster connectivity, wherein graph nodes correspond to endpoints or junctions and graph edges correspond to strokes.

10. The image processor of claim 8, wherein the set of stored rules about particle movement comprise rule steps that form an iterative process considering pixel gradients.

11. The image processor of claim 8, wherein the vector representation is a portion of a hybrid representation that encodes for vectors corresponding to strokes and pixel color values and includes mappings of pixels to strokes.

12. A non-transitory computer-readable medium containing program instructions that, when executed by a computer, generate a vector representation of lines present in a pixelated image available to the computer, comprising:
program code for receiving the dataset corresponding to input pixelated image in a computer-readable form;
program code for extracting a centerline of the dataset, wherein the program code for extracting the centerline is configured to:
identify a plurality of pixels in the dataset;
estimate a direction from at least some of the plurality of pixels to an estimated centerline; and
advance the at least some of the plurality of pixels towards the estimated centerline;
program code for determining a topology of the lines in input pixelated image, thereby forming topology data, the topology data comprising end points and junctions connected by a minimum spanning tree;
program code for using the topology data to identify locations of endpoints and junctions of at least some of the lines;
program code for determining stroke intersections, representing stroke intersection points or regions, wherein determining stroke intersections is done dependent on the identified locations of endpoints and junctions; and
program code for generating a vector representation of the input pixelated image, representing lines, line segments or curve portions that correspond to centerlines or reference lines for each of a plurality of strokes corresponding to lines formed by pixel color values of the input pixelated image.

13. The non-transitory computer-readable medium of claim 12, further comprising:
program code for representing pixels by particle structures having size and location;
program code for generating a map of pixel clusters; and
program code for generating a graph of pixel cluster connectivity, wherein graph nodes correspond to endpoints or junctions and graph edges correspond to strokes.

14. The non-transitory computer-readable medium of claim 12, wherein the program code for determining a topology of the lines in input pixelated image comprises program code for determining lines in the input pixelated image using an iterative process considering pixel gradients.

15. The non-transitory computer-readable medium of claim 12, wherein the vector representation is a portion of a hybrid representation that encodes for vectors corresponding to strokes and pixel color values and includes mappings of pixels to strokes.

16. The non-transitory computer-readable medium of claim 12, wherein the program code for determining a topology of the lines in the input pixelated image comprises program code for generating a particle clustering table having entries representing a particle cluster.

17. The non-transitory computer-readable medium of claim 12, wherein the program code for determining a topology of the lines in the input pixelated image comprises:
program code for generating a graph of coarse point clouds; and
program code for using successive neighbors in a process of detecting point cloud endpoints, wherein a center of mass of a neighborhood is computed for increasing radii to provide a plurality of traces of the center of mass at different scales.

18. The non-transitory computer-readable medium of claim 12, wherein the program code for determining stroke intersections comprises:
program code for selectively masking segments of the input pixelated image as determined in a segmenting step; and
program code for determining stroke intersections based on unmasked segments.

* * * * *